United States Patent [19]
Lesko et al.

[11] Patent Number: 5,351,106
[45] Date of Patent: Sep. 27, 1994

[54] EXPOSURE SYSTEM

[75] Inventors: Robert J. Lesko, Newton; Ira J. Pitel, Morristown, both of N.J.

[73] Assignee: Amergraph Corporation, Sparta, N.J.

[21] Appl. No.: 724,336

[22] Filed: Jul. 1, 1991

[51] Int. Cl.$^5$ .............................................. G03B 27/80
[52] U.S. Cl. ...................................... 355/83; 355/88; 355/69; 355/132
[58] Field of Search ...................... 355/38, 68, 30, 69, 355/77, 133, 83, 88, 132; 346/107 R, 110 R, 160; 358/76, 80, 300

[56] References Cited

U.S. PATENT DOCUMENTS

| | | |
|---|---|---|
| 2,180,164 | 11/1939 | Minneci . |
| 2,514,595 | 7/1950 | Austin . |
| 2,815,454 | 3/1957 | Gilbert . |
| 2,830,253 | 4/1958 | Sleeper, Jr. . |
| 3,262,356 | 7/1966 | Forbes . |
| 3,555,987 | 1/1971 | Browning ...................... 350/167 X |
| 3,702,732 | 11/1972 | Sliwkowski ...................... 355/68 |

(List continued on next page.)

OTHER PUBLICATIONS

Olec Brochure, AL900.
Olec Brochure, AL100.
Olec, "Illuminating Perfection".
Burgess Brochure "Controlux".
Burgess Brochure "Addalux".
Burgess Brochure "Addalux Lamps".
Thiemer Brochure "Montakop".
Thiemer Brochure "Violux T".
Amergraph "System 7500".

*Primary Examiner*—D. Rutledge
*Attorney, Agent, or Firm*—Rhodes, Coats & Bennett

[57] ABSTRACT

An exposure system for light sensitive materials held in a vacuum frame includes an electrical light source and a power supply to the light source, the power supply having a power consumption monitor so it can modify the power supplied to the light source to compensate for any fluctuations in power consumption by the light.

The light source is supported in a housing having air exhaust openings proximate the mid-portion of the light source. A blower cools the light source with a helical airflow. The voltage drop across the electrical light source is used to control the speed of the blower to maintain the voltage of the light source at a desired level. The housing has an open face and a removable pane. An indicator indicates the presence of the pane. A metal shutter in the housing has a black ceramic surface adjacent the light source to selectively expose light sensitive materials. A control means closes the shutter when the indicator senses removal of the pane while power is being supplied to the light source. The control means includes a timer to hold the shutter closed for a period of time after the switch is opened, long enough to permit cooling of the light source and opens the shutter after expiration of the period. It also actuates the blower during the period to hasten the cooling of the light source.

The control unit to control operating parameters of a plurality of subsystem units of the exposure system includes an electronic memory unit and means responsive to signals stored in the electronic memory unit to control variables. The control lines of the control unit and the subsystem units have a plurality of physically equivalent, but electrically unique, pin socket outputs each having a plurality of electrical leads. A plurality of cables having physically and electrically identical terminations are provided, so that any of the cables may be used to connect a pin socket of the control unit to a pin socket of a subsystem unit.

The control unit includes a keyboard input to the memory storage means of variables to be stored. The keyboard includes function keys to select the variable to be assigned a value and numeric keys to assign a numeric value to a selected numeric variable.

42 Claims, 11 Drawing Sheets

U.S. PATENT DOCUMENTS

| | | | |
|---|---|---|---|
| 3,732,011 | 5/1973 | Hansard | 355/68 |
| 3,771,869 | 11/1973 | Diehl et al. | 355/85 |
| 3,864,036 | 2/1975 | VanHeerentals | 355/68 |
| 3,873,200 | 3/1975 | Crete et al. | 355/38 |
| 3,936,186 | 2/1976 | Boland et al. | 355/68 X |
| 3,999,100 | 12/1976 | Dendy et al. | 315/308 |
| 4,030,833 | 6/1977 | Barbieri | 355/38 X |
| 4,080,050 | 3/1978 | Huber | 359/889 |
| 4,190,795 | 2/1980 | Schultheis | 323/17 |
| 4,239,376 | 12/1980 | Wyller | 355/65 X |
| 4,283,658 | 8/1981 | Parker | 315/117 |
| 4,299,481 | 11/1981 | Chapman | 355/69 |
| 4,371,259 | 2/1983 | Howitt | 355/38 |
| 4,385,828 | 5/1983 | Prentice | 355/132 |
| 4,506,977 | 3/1985 | Sabo et al. | 355/53 |
| 4,515,468 | 5/1985 | Taylor et al. | 355/27 |
| 4,528,685 | 7/1985 | Kump et al. | 378/157 |
| 4,562,120 | 12/1985 | Axelrod et al. | 354/1 |
| 4,589,080 | 5/1986 | Abbott et al. | 355/206 |
| 4,598,995 | 7/1986 | Rogers | 355/73 X |
| 4,645,982 | 2/1987 | Takayanagi | 355/67 X |
| 4,653,885 | 3/1987 | Araki et al. | 354/173.1 |
| 4,707,116 | 11/1987 | Newiger et al. | 355/30 |
| 4,782,369 | 11/1988 | Yasuda et al. | 355/69 |
| 4,791,453 | 12/1988 | Koseki et al. | 355/206 |
| 4,896,185 | 1/1990 | Okuzawa | 355/35 |
| 4,935,772 | 6/1990 | Wakui et al. | 355/68 |
| 4,989,032 | 1/1991 | Hull et al. | 355/38 |
| 4,999,668 | 3/1991 | Suzuki et al | 355/38 |
| 5,016,047 | 5/1991 | Meacham | 355/71 |
| 5,023,652 | 6/1991 | Purro | 355/68 X |

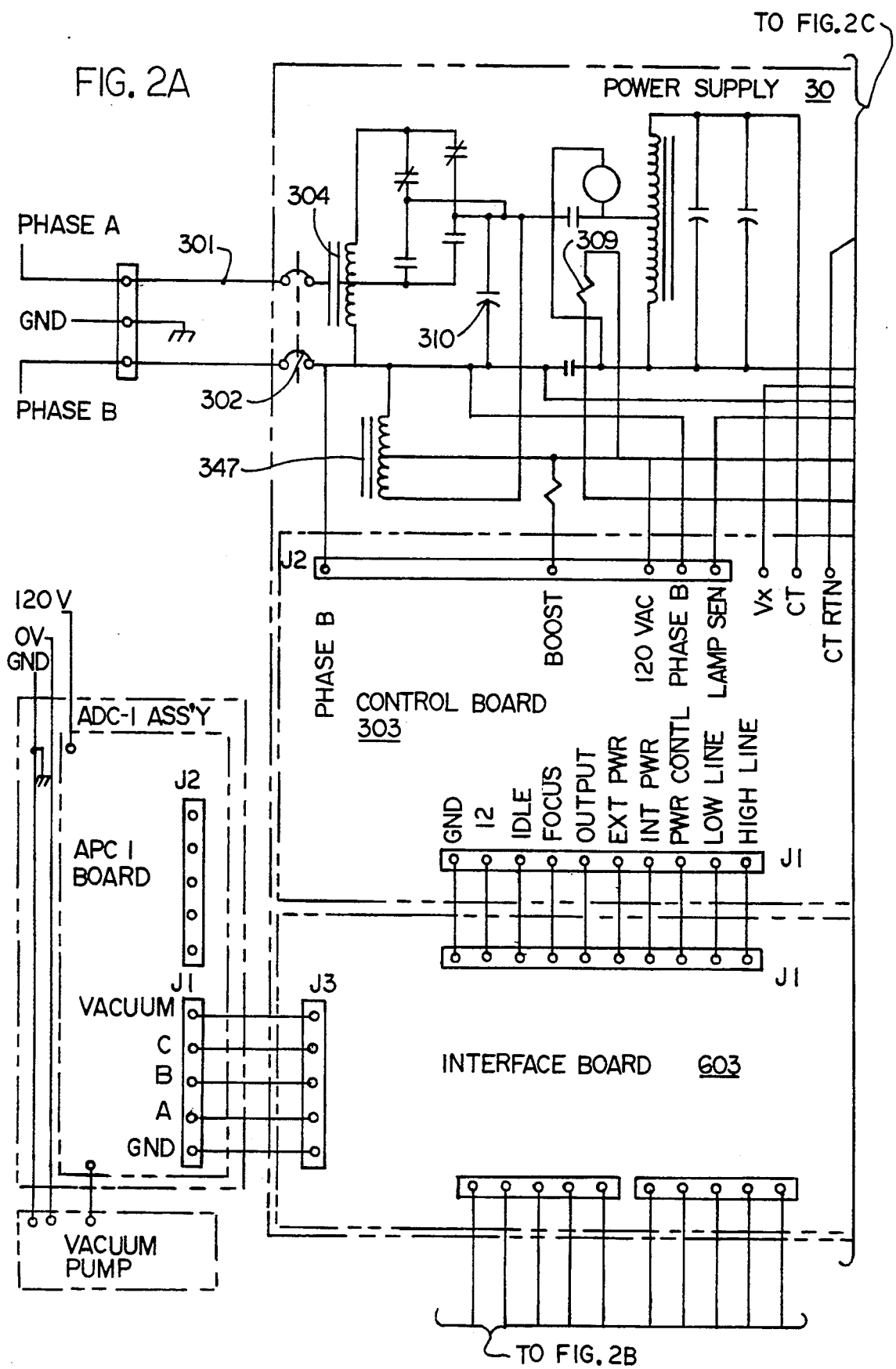

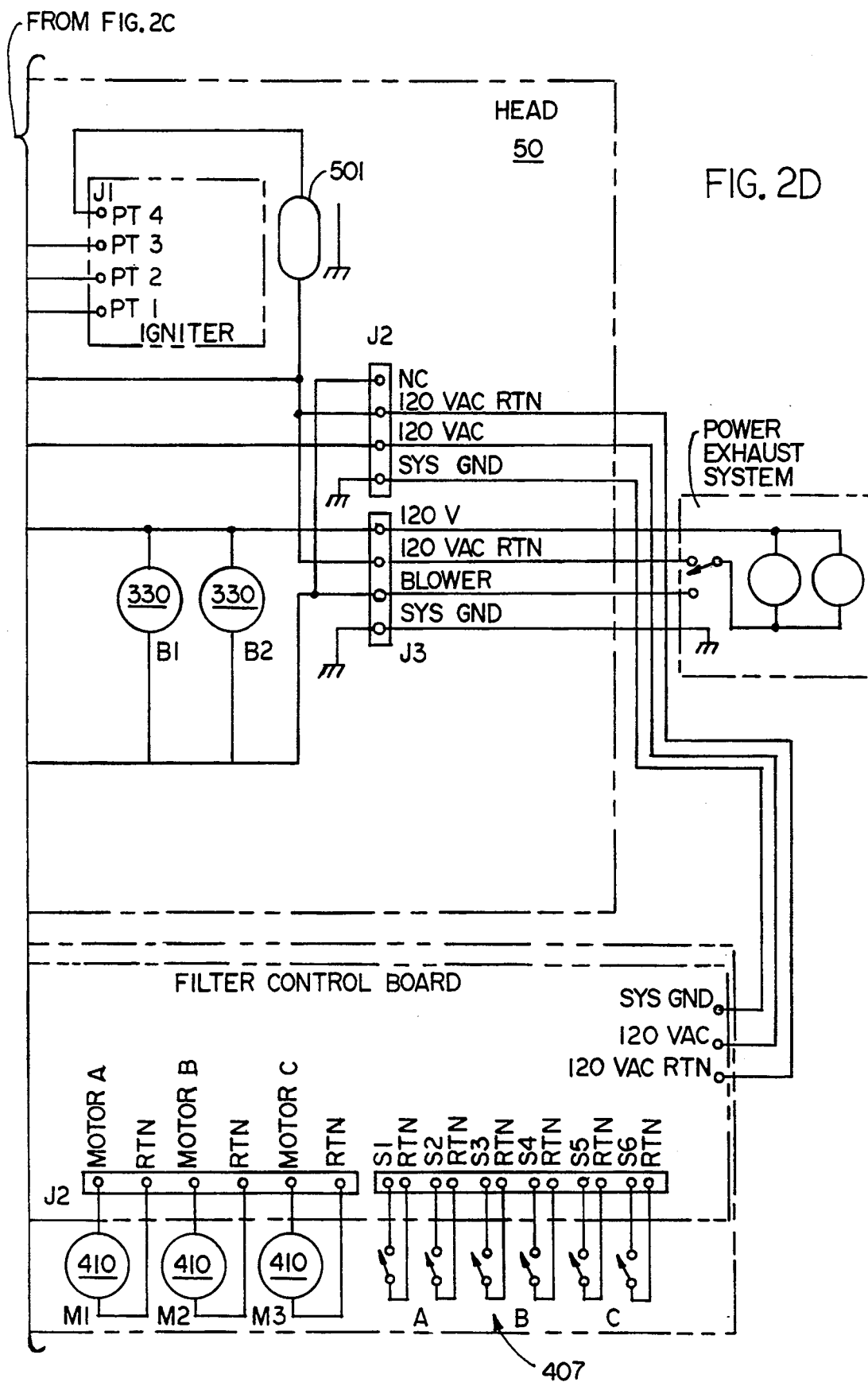

EXPOSURE SYSTEM

BACKGROUND OF THE INVENTION

The present invention relates to improvements in vacuum frames and exposure devices for light sensitive material. Numerous shortcomings in prior art devices have existed and the present invention addresses various such aspects to improve upon the functioning of the vacuum frame.

A vacuum frame consists generally of a support in which a flexible blanket and light-transmissive plate form two major boundaries of a flat chamber. A negative and light sensitive material are placed on the blanket, so that light passing through the light-transmissive material will be modified by the negative and expose the light sensitive material. When the flat chamber is closed, a vacuum is drawn in that chamber so that the blanket will flexibly be urged against the glass and bring the negative and light sensitive material into intimate contact. A particularly preferred vacuum frame arrangement is disclosed in U.S. Pat. No. 4,754,309 issued to assignee of the present invention on Jul. 25, 1986. The entire disclosure of that patent is hereby incorporated herein by reference.

The light sensitive materials to be exposed come from various manufacturers who develop new light sensitive emulsions quite regularly. Each emulsion has its own sensitivity to light, so that the wave length of the light impacting on the light sensitive material and the relative intensity at the various wave lengths of the spectrum are critical to getting an optimum exposure. Also, there are various light sources, which can be used, and each has its own spectral output, which may vary according to operating conditions.

In order to achieve good exposures, it is important to match up the spectral output of the light source with the sensitivity of the light sensitive material, and to insure that the exposures are controlled so that the desired correlation is obtained and maintained. A frequently used light source is a high intensity discharge light in which an envelope of glass is provided with electrodes on either end and filled with a gas, and sometimes also dopant materials. When a very high voltage is applied across the two electrodes of the light source, the gas in the envelope ionizes and becomes quite conductive so that electrical current is maintained between the two electrodes. As the lamp gets hot, it begins to glow and the dopant vaporizes and ionizes. The current passing through the gas and dopant causes the materials to emit light, with the frequency and wavelength of the light being determined by the temperature of the envelope. The desired operating temperature for these bulbs is typically on the order to 900 degrees Celsius or greater, in order to obtain the spectral distribution from the lamp as contemplated by its manufacturer.

As can be appreciated, the lamp does not immediately jump to such a high temperature from room temperature at start-up, but rather takes some time to reach its optimum operating temperature. As such, it is desirable to maintain the lamp in a standby condition very close to its operating temperature, so that when an exposure is desired, it is not necessary to wait for lamp warmup. In addition such lamps are difficult or impossible to make conducting when they are hot, so turning them off requires a cool-down period on the order of several minutes before they can be turned on again.

Such lamps are reliable sources of their designed spectrums, as long as the lamp power supply is supplied with electrical power of a constant voltage. However in industrial settings, where devices of this nature are used, there can be wide swings in voltage applied to lamps from other loads on the electrical system, causing voltage surges and drops. These can materially adversely effect the control that the operator has over the light output from the lamp. Also, as the lamp ages, its operating characteristic can vary, presenting an additional variable which it is desirable to control.

Prior art devices have attempted to accommodate the voltage fluctuation and lamp life deterioration problems using integrators which integrate either the voltage applied to the lamp power supply or the measured light output from the lamp, as measured by a photocell. Both of these approaches have merit, but neither have in the past been accomplished in a manner which permits maximum control over the exposure, in order to achieve precise results.

Furthermore, prior art integrators have used only one means of monitoring the lamp operation in order to determine when to stop directing light from the lamp to the light sensitive material. This results in a lack of flexibility and lack of precision control over the light output.

In addition, problems have been encountered with lamps, particularly in their replacement in that workers sometimes prematurely try to handle a hot lamp when replacing it. They can be severely burned by the extraordinarily hot lamp, or subjected to dangerous electrical shock from touching the electrical connections while attempting to change lamps.

Also, the power applied to the lamp has in the past been selectable, at most, three increments as dictated by switching of inductive ballasts in series with the lamp circuit. This provides less control over the light output than is optimum.

The light output from the HID lamps is often in the ultraviolet range and is useful for exposing the light sensitive materials sensitive to such high energy wavelengths. However, other distributions of light output are also desirable, depending upon the results sought. Filters have been known to modify distribution of wavelengths from the light source but have had only limited utility in prior art devices.

Another shortcoming of the prior art devices has been in assembling them on a customer's premises. The various components from an integrator or other control device to a vacuum control, to the light source or the like have been difficult and problematic to wire. As can be appreciated, if the wire intended to go to the light is instead hooked up to the vacuum, calamitous results may occur.

Also, the operation of the lamp, as stated before, is very temperature sensitive. Temperature fluctuations can change the spectral output, so a lack of control over lamp temperature can lead to undesirable exposures. Also, as the lamps age, they can develop hot spots or cold spots where the dopants preferentially have condensed on parts of the envelope and do not re-vaporize as readily. These problems also require resolution.

In addition, the worker who mans a vacuum frame for extended periods of time has a tedious job, which can lead to inattentiveness. With so much care being required to obtain just the right exposure, there is a need to provide the operator with an easy way to cause the lamp and vacuum frame to operate properly, even if the worker becomes distracted.

Accordingly, as can be seen, there are numerous shortcomings in prior art devices of this sort needing resolution.

SUMMARY OF THE INVENTION

The present invention fulfills this need in the art by providing an exposure system for light sensitive materials including an electrical light source and a power supply to the light source. The power supply has a power consumption monitor to continuously monitor the power consumed in the light source and to modify the power supplied to the light source to compensate for any fluctuations in power consumption by the light source to maintain the power consumption at a constant level. Typically, the light source has negative resistance and the power supply includes an inductor in series with the light source to limit current through the light source. Preferably, the monitor includes means for sampling the voltage and current through the light source to ascertain the power consumed in the light source and evaluates the average of the product of the voltage and current. A desirable power supply for the light source includes a silicon controlled rectifier in series with the light source. Typically, circuit means are provided to control a firing angle of the silicon controlled rectifier and the monitor compares the average with a desired set point and modifies the firing angle of the silicon controlled rectifier to increase or decrease the power to the light source. Preferably, the exposure system includes a digital set point storage means for storing a desired light source power consumption level.

The power supply also preferably includes a line voltage supply having a selective voltage tap to boost or depress incoming voltage to the light source to attenuate line voltage fluctuations. It may also include or substitute an integrator to integrate the amount of light emitted from the light source over a period of time with a light cut-off means to cut off further light output from the light source when a selected amount of light has been emitted from the light source.

In order to accommodate a wide range of light sensitive materials, the power supply preferably has the capacity to supply several kilowatts of electrical power to the light source and has the capacity to supply reduced power to the light source, reduced by increments of about one hundred watts.

Although the most commonly used light source will probably be a high-intensity discharge lamp, the present invention also contemplates the use of an electrical quartz light source. For quartz sources, the power supply includes a control device having an electronic memory storage means and means responsive to signals stored in the electronic memory storage means to supply electrical power to the quartz light source, including a means to sample the voltage of the electrical power supplied to the quartz light source, to integrate the sampled voltage over time, to compare the integrated voltage with a stored exposure value and to cease supplying light from the quartz source when the integrated voltage corresponds to the stored exposure value.

Light sensitive materials often have selected spectral sensitivities, so that the incident light should have a specific distribution of wavelengths to effect the most desirable results. For these materials requiring a particular spectral distribution of incident light, the invention provides a voltage drop sampling means across the electrical light source, a blower arranged with respect to the light source to blow cooling air towards the light source, and a speed control device for the blower to control the speed of the blower in response to sampled voltages to maintain the voltage and therefore the temperature and spectral distribution of the light source at a desired level.

Desirably, the power supply has the capacity to supply several kilowatts of electrical power to the light source and having the capacity to supply reduced power to the light source, reduced by increments of about one hundred watts. In one embodiment the power supply can supply 7500 watts of power to the light source.

Desirably, the housing has an open face and a rotary shutter positioned and arranged to be selectively rotated around the light source. The rotary shutter is provided with axial openings through which the cooling air may flow.

The invention typically includes a vacuum frame to hold the light sensitive materials. A filter housing is interposed between the light source and the vacuum frame, the filter housing having at least three filters selectively positionable between the light source and light sensitive materials in the vacuum frame. The housing preferably has means to position the filters between the light and the vacuum frame singularly or in multiples. In one embodiment, the housing has opposed channels facing one another across an open area and the positioning means for each filter includes a frame for the filter having opposed sides and mounted for reciprocation in opposed channels of the housing. A cable connected to either side of the frame passes through the housing to be driven to position the frame. A motor driving a sheave around which the cable for the filter is trained drives the frame and its filter into or out of position by actuation of the motor. The housing has limit switches actuable by the positioning of the filter either in or out of position to stop the actuation of the motor. The cable and sheave are selected of materials and configured so that the cable can slip around the sheave to prevent injury to things in the way of a driven filter or to permit the movement of the filter by hand without actuation of the motor. This result can be advanced by including a spring in the cable.

A preferred embodiment includes a memory unit to recall a particular arrangement of filter positions and a program actuation means to actuate the positioning means to position the filters in accordance with a recalled arrangement. Preferably, the filter housing has a plurality of selectively positionable frames and at least one of the filters is removably mountable in at least one of the frames.

The invention also provides an exposure system control unit to control operating parameters of a plurality of subsystem units of the exposure system, such as the filter housing. Control lines from the control unit to the subsystem units include a plurality of physically equivalent, but electrically unique pin socket outputs, each having a plurality of electrical leads on the control unit. Physically equivalent, but electrically unique pin sockets each having a plurality of electrical leads are provided on the subsystem units. A plurality of cables are also provided, having physically and electrically identical terminations such that any of the cables may be used to connect a pin socket of the control unit to a pin socket of a subsystem unit. Thus are provided chainable control lines. Desirably, each of the pin sockets has an associated plurality of switches actuable to activate or deactivate associated ones of the electrical leads. In one embodiment at least one of the subsystems includes a power source and a power outlet, such that an electrical signal on an actuated one of the leads connects the power source and the power outlet to supply power to the outlet under control of the control unit. The cables may be connected in series to pass signals on all of the leads. Desirably, the cables also have pluralities of switches and outputs such that signals on selected ones of the cables may be derived on the outputs by actuation of a corresponding switch while passing signals to connected cables or subsystems.

Typically, the light source operates at a high temperature, such as 900 degrees celsius or more. Such temperatures can cause early failure of the materials of shutters which must operate in close proximity to the light source. The present invention provides a shutter having a ceramic surface adjacent the light source to selectively expose light sensitive materials on the support to light from the high temperature light source. In a preferred embodiment, the shutter is metal coated with a ceramic. Preferably, the ceramic surface is black, to maximize light control. Typically, the distance from the shutter to the support is several times the distance from the shutter to the light source and the light source is a source of ultraviolet light.

The light source is usually configured to have two ends and a mid-portion. According to the invention, a housing supports the electrically powered light source and has air exhaust openings proximate the mid-portion of the light source. A blower arranged with respect to the light source in the housing blows cooling air towards the ends of the electrically powered light source at an acute angle to the light source length, to form a helical airflow around the light source and out the air exhaust openings.

Preferably, a removable pane covers the open face with an indicator to indicate the presence of the pane. The control means includes means responsive to the indicator and to the switch to close the shutter when the indicator senses removal of the pane while power is being supplied to the light source to prevent access to the light source while power is being supplied to the light source.

In a preferred embodiment the control means includes a timer and is responsive to the switch to hold the shutter closed for a period of time after the switch is opened, long enough to permit cooling of the light source and to open the shutter after expiration of the period. Preferably, the blower to cool the light source is controlled by the control means, and the control means actuates the blower during the period after the switch is opened to hasten the cooling of the light source. In a preferred embodiment the control means is capable of controlling the rate of flow of air through the blower within a range and maintains the rate at a high level of the range during the period.

Typically, the electrically powered light source has an operating characteristic such that the voltage drop across the light source is generally proportional to the temperature of the light source. In the case of light sources having portions which are more luminous than others, forming hot spots, the housing desirably includes a reflector with darkened portions adjacent the more luminous portions of the light sources. Preferably, the darkened portions are black ceramic. Typically, the more luminous portions are near the mid portion.

The invention also provides a control device for an exposure system for light sensitive materials. The device includes an electronic memory storage means and means responsive to signals stored in the electronic memory storage means to control power to a light source in increments of 100 watts. In another preferred form the control device includes an electronic memory storage means and means responsive to signals stored in the electronic memory storage means to control such variables as power to a light source, the position of filters between the light source and the light sensitive materials, the timing of a vacuum drawdown, and which of several photocells will be used to monitor the light from the light source. A keyboard input to the memory storage means of variables to be stored includes function keys to select the variable to be assigned a value and numeric keys to assign a numeric value to a selected numeric variable. A plurality of signal lights are arranged and connected to the memory storage means to display during data input to the memory storage means which variable is next to be assigned a value or selected, such that a user keying in data for storage can easily tell for which variable the keyboard is active to assign a selection or a numeric value. Typically, one of the signal lights flashes on and off when data is to be entered for the variable labeled for that signal light. Preferably, the electronic memory storage means has capacity for 99 combinations of variables. The memory storage preferably has capacity to recall a plurality of combinations of variables, one of which is the power to a light source, in increments of 100 watts.

The control device also preferably includes a switch to turn the signal lights on or off without disturbing the values stored in the memory storage. Preferably, the control device includes a counter to store the number of exposures made with the exposure system, with a display to display the number stored. More preferably, the control device includes a switch to reset the counter to zero, so that the storage of the number of exposures may be restarted as desired.

In another aspect the invention provides a method of controlling the spectral output of a high temperature electrically powered light source having two ends and a mid-portion for an exposure system. The method includes supporting the electrically powered light source in a housing having air exhaust openings proximate the mid-portion of the light source, supplying electrical energy to the light source, and blowing air towards the ends of the electrically powered light source at an acute angle to the light source length to form a helical airflow around the light source and out the air exhaust openings. Preferably, the method also includes sampling the voltage drop across the light source and controlling the rate of air blowing towards the light source in response to sampled voltages to maintain the voltage and therefore the temperature and spectral output of the light source at a desired level.

The invention also provides a method of exposing light sensitive materials including supplying electrical power to a light source, continuously monitoring the power consumed in the light source and modifying the power supplied to the light source to compensate for any fluctuations in power consumption by the light source to maintain the power consumption at a constant level. Preferably, the method includes limiting the current through the light source by supplying the current through an inductor in series with the light source. The method may take the form of sampling the voltage and current through the light source to ascertain the power consumed in the light source. There may also be a preliminary steps of providing a variable power supply for the light source and selecting a set point of power to be supplied to the light source from a dozen or more possible set points. Desirably, the monitoring includes evaluating the average of the product of the voltage and current.

In one embodiment the modifying step includes comparing the average with a desired set point and adjusting the firing angle of a silicon controlled rectifier in series with the light source to increase or decrease the power to the light source.

In the case of an electrical quartz light source, the invention may include sampling the voltage of the electrical power supplied to the quartz light source, integrating the sampled voltage over time, comparing the value of the integrated voltage with a stored exposure value and ceasing the supplying of light from the quartz source when the integrated voltage corresponds to the stored exposure value.

The invention includes the method of exposing light sensitive materials including holding the light sensitive materials in a vacuum frame, exposing the light sensitive materials to a light source through a filter housing between the light source and the vacuum frame, and selectively positioning one or more of at least three filters in the housing between the light source and light sensitive materials in the vacuum frame. Preferably, the positioning step includes inserting a filter in a frame in opposed channels of the housing and actuating a cable connected to either side of the frame and passing through the housing to position the frame and its inserted filter. More preferably, the positioning step includes energizing a motor driving a sheave around which the cable for the filter is trained to drive the frame and its filter into or out of position. The positioning step may include closing limit switches actuable by the positioning of the filter frame either in or out of position to stop the energization of the motor. The positioning step may also include slipping the cable around the sheave to move the filter by hand. Preferably, there are a plurality of filters and the positioning step includes recalling a particular arrangement of filter positions stored in a memory unit and energizing the motor to position the filters in accordance with a recalled arrangement.

The method also may include the preliminary steps of providing a control unit to control operating parameters of a plurality of subsystem units of the exposure system including the filter housing. This aspect of the method includes providing control lines from the control unit to the subsystem units including a plurality of physically equivalent, but electrically unique pin socket outputs each having a plurality of electrical leads on the control unit and providing physically equivalent, but electrically unique pin sockets each having a plurality of electrical leads on the subsystem units. The method includes providing a plurality of cables having physically and electrically identical terminations such that any of the cables may be used to connect a pin socket of the control unit to a pin socket of a subsystem unit, selecting any of the control lines to connect a pin socket of the control unit with the pin socket of its corresponding subsystem unit and inserting the terminations in their respective pin sockets. Preferably, switches are associated with the pin sockets actuable to activate or deactivate associated ones of the electrical leads and the method further including actuating selected switches to activate leads as desired.

The invention also provides a method of cooling an electrically powered high temperature light source having two ends and a mid-portion for an exposure system for light sensitive materials. The method includes supporting the electrically powered light source in a housing having air exhaust openings proximate the mid-portion of the light source and blowing air towards the ends of the electrically powered light source at an acute angle to the light source length to form a helical airflow around the light source and out the air exhaust openings.

When the housing has a rotary shutter rotatable around the light source the invention may further include blowing the cooling air through axial openings in the rotary shutter.

Further, the invention provides a method of controlling the spectral output of a high temperature light source for an exposure system including supplying electrical energy to the light source, sampling the voltage drop across the light source, blowing cooling air towards the light source, controlling the rate of air blowing towards the light source in response to sampled voltages to maintain the voltage and therefore the temperature and spectral output of the light source at a desired level.

In a further aspect, the invention provides a method of preventing injuries from touching very hot light sources in an exposure system for light sensitive materials including the steps of providing a housing, a light source in the housing, a power supply electrically connected to the light source through a switch, a shutter for the light source inside the housing, the housing having an open face through which light from the light source passes when the shutter is open and a removable pane covering the open face with an indicator to indicate the presence of the pane covering the open face and, upon sensing removal of the pane and closure of the switch, closing the shutter to prevent access to the light source while power is being supplied to the light source.

According to yet another aspect, the invention provides a method of preventing injuries from touching very hot light sources in an exposure system for light sensitive materials including the steps of providing a high temperature light source, a power supply electrically connected to the light source through a switch, a shutter for the light source, holding the shutter closed for a period of time after the switch is opened long enough to permit cooling of the light source and opening the shutter after expiration of the period. Preferably, the method includes blowing cooling air towards the light source during the period after the switch is opened to hasten the cooling of the light source.

A further aspect of the invention includes a method of controlling an exposure system for light sensitive materials. This includes providing an electronic memory and means responsive to signals stored in the electronic memory to control such variables as power to a light source, the position of filters between the light source and the light sensitive materials, the timing of a vacuum draw-down, and which of several photocells will be used to monitor the light from the light source. It also includes providing a keyboard input to the electronic memory of variables to be stored and including function keys to select the variable to be assigned a value and numeric keys to assign a numeric value to a selected numeric variable. A further step in the method includes providing a plurality of signal lights connected to the electronic memory and arranged to display during data input to the electronic memory which variable is next to be assigned a value or selected. Further steps are recording in the electronic memory values for a plurality of the variables by pressing function keys corresponding to a function to be remembered as prompted by the signal light corresponding to the function, pressing a numeric key corresponding to a value to be assigned to a function, and actuating the exposure system so that the functions and values recorded in the electronic memory are used to control the corresponding functioning portion of the exposure system. In a preferred embodiment, the recording step includes pressing keys to a plurality of combinations of variables, one of which is the power to a light source, in increments of 100 watts. In another aspect, the invention includes controlling exposures with a quartz light source including providing electrical power to a quartz light source, sampling the voltage of the electrical power supplied to the quartz light source, integrating the sampled voltage over time, comparing the value of the integrated voltage with a stored exposure value and ceasing supplying light from the quartz source when the integrated value equals the stored value.

BRIEF DESCRIPTION OF THE DRAWINGS

The invention will be better understood from a review of the detailed description of the preferred embodiment along with a review of the drawings, in which:

FIGS. 2A, 2B, 2C and 2D connect together as indicated thereon to form a schematic diagram of the electrical system of the embodiment of FIG. 1;

DETAILED DESCRIPTION OF THE PREFERRED EMBODIMENT

Figure 1:
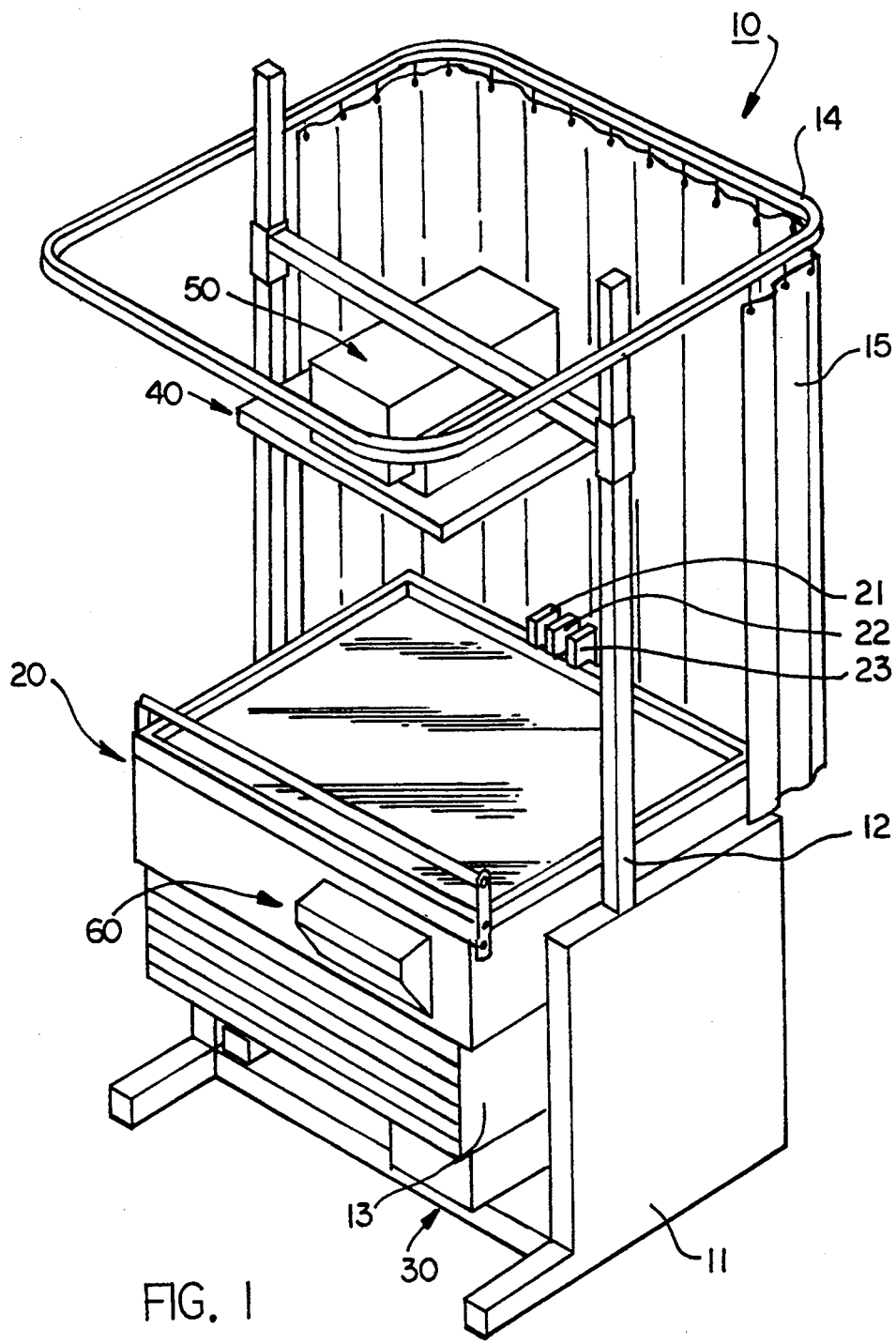
FIG. 1 is a perspective view of a preferred embodiment of the exposure system.

A preferred embodiment of the invention can be seen in FIG. 1 in which a perspective overall view of the apparatus 10 can be seen. The apparatus includes various sub-systems including a vacuum frame 20, a power supply 30, a filter assembly 40, a light head 50, and an integrator 60. The various subsystems will be discussed in turn.

The assembly 10 includes a base 11 from which uprights 12 extend supporting the light hood 50 which in turn supports the filter assembly 40. A chest of drawers 13 is provided in which exposure materials can be stored for ready accessibility. A curtain rod 14 is provided supporting a curtain 15 which can be closed to exclude ambient light from the vacuum frame 20. Base 11 also supports power supply 30. The vacuum frame 20 can be any of various types known in the art, although a particularly preferred embodiment is the structure disclosed in U.S. Pat. No. 4,754,309, referred to above. The entire disclosure thereof is incorporated herein by reference. Controls for the operation of the vacuum frame are included in the integrator 60 or may be automated, as disclosed further in this discussion.

Power Supply

Figure 2B:
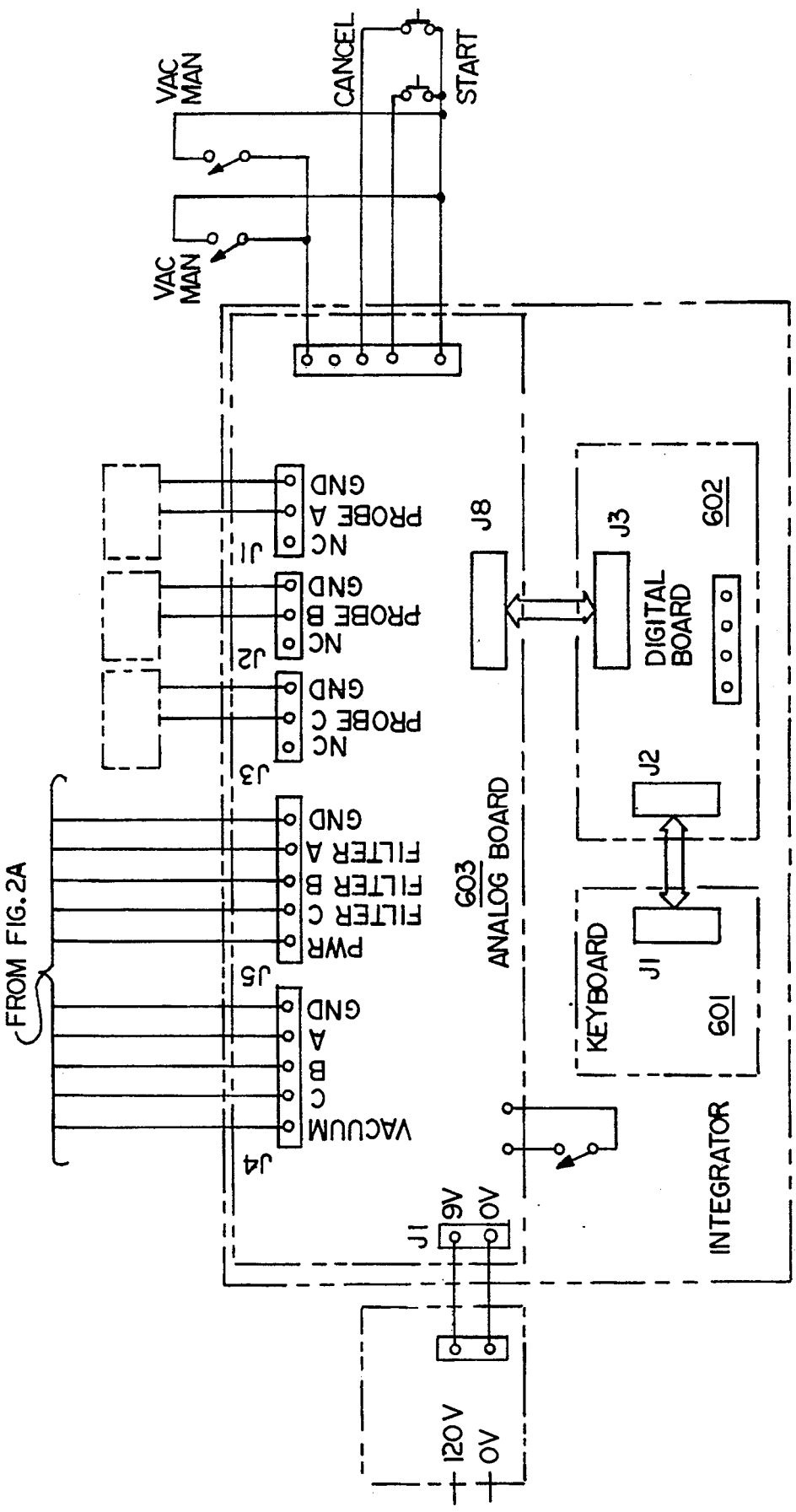
Figure 2C:
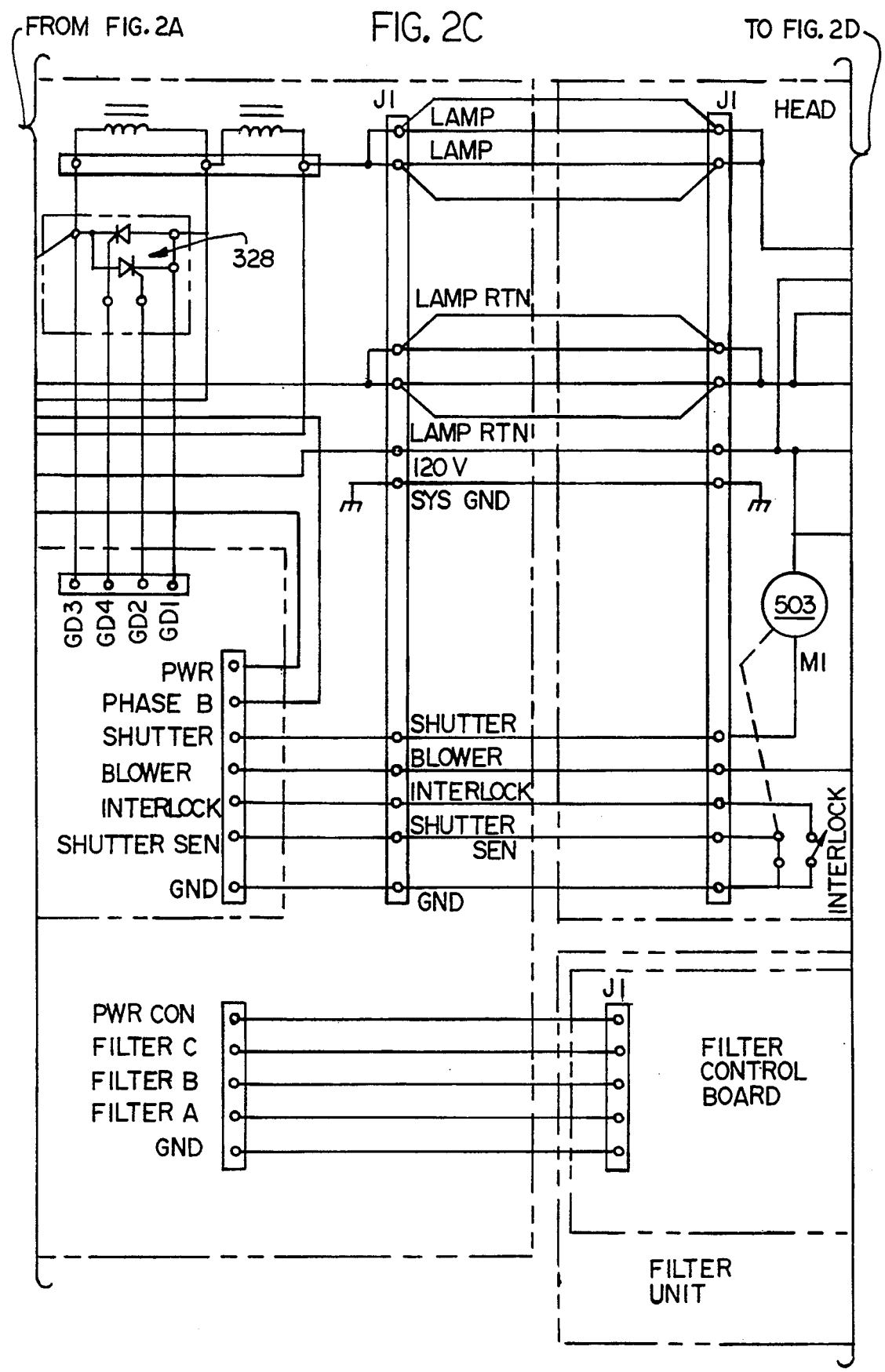
Figure 3A:
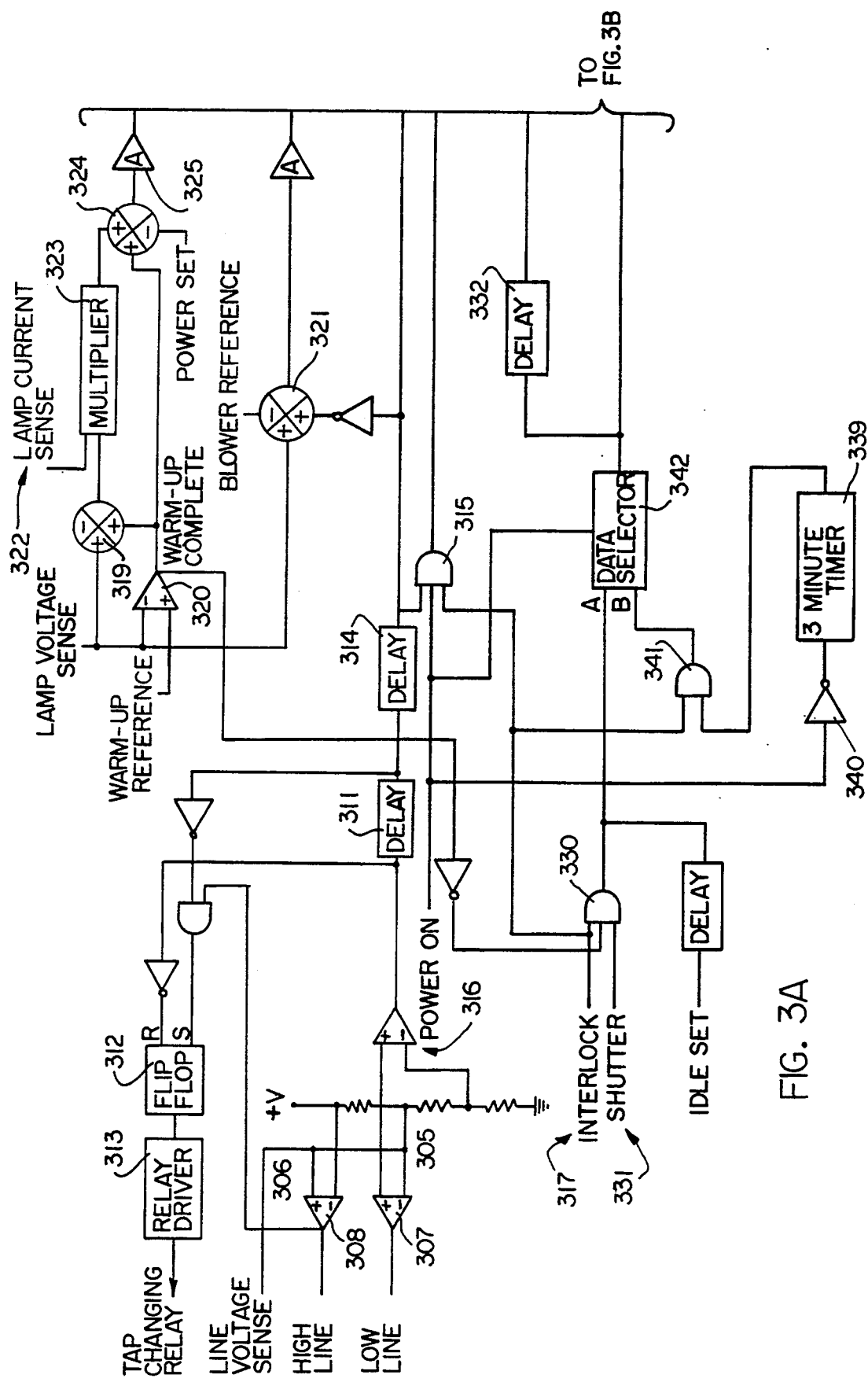
FIGS. 3A and 3B connect together as indicated thereon to form an enlarged diagram of the control board depicted in FIG. 2.
Figure 3B:
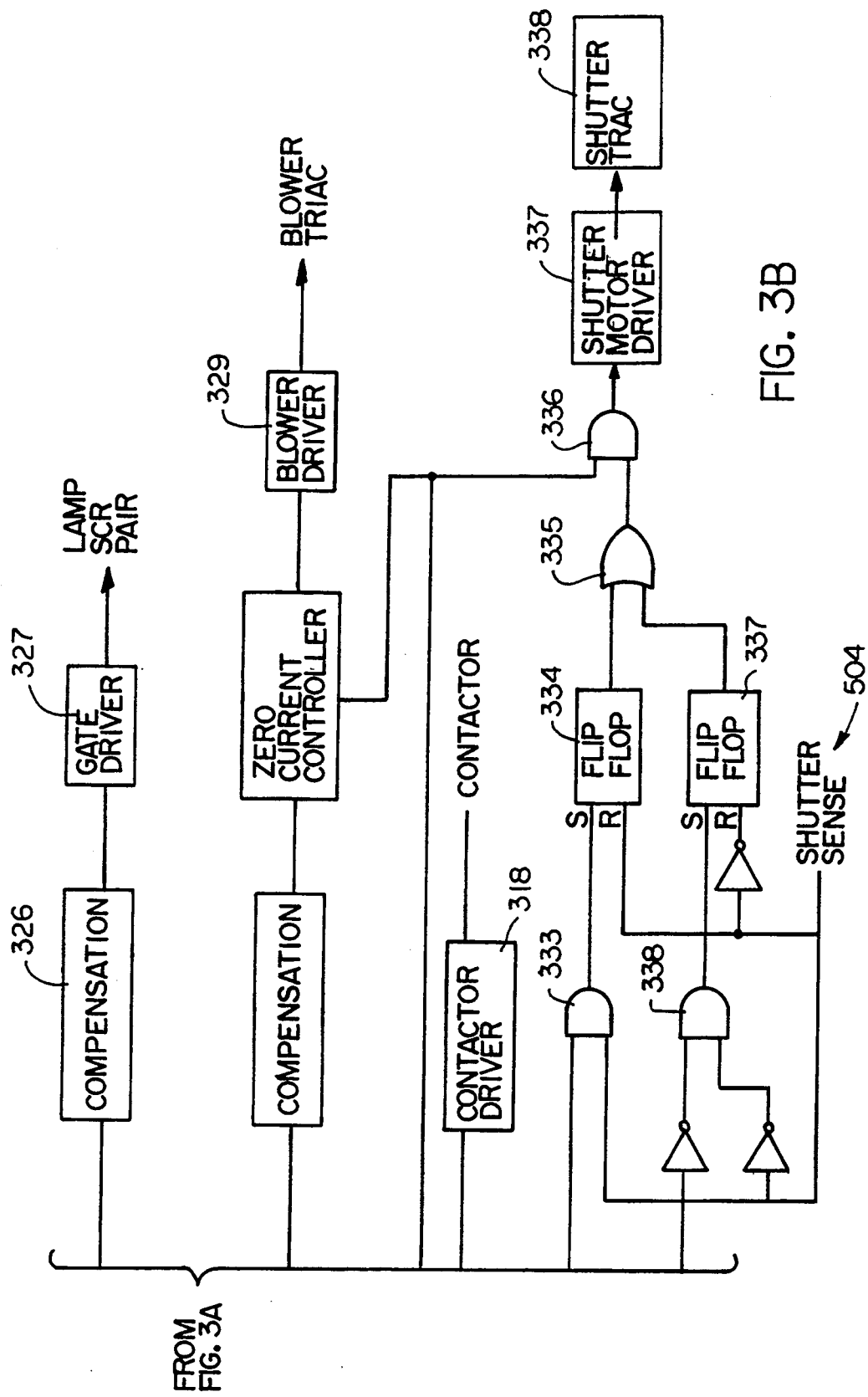
Figure 8:
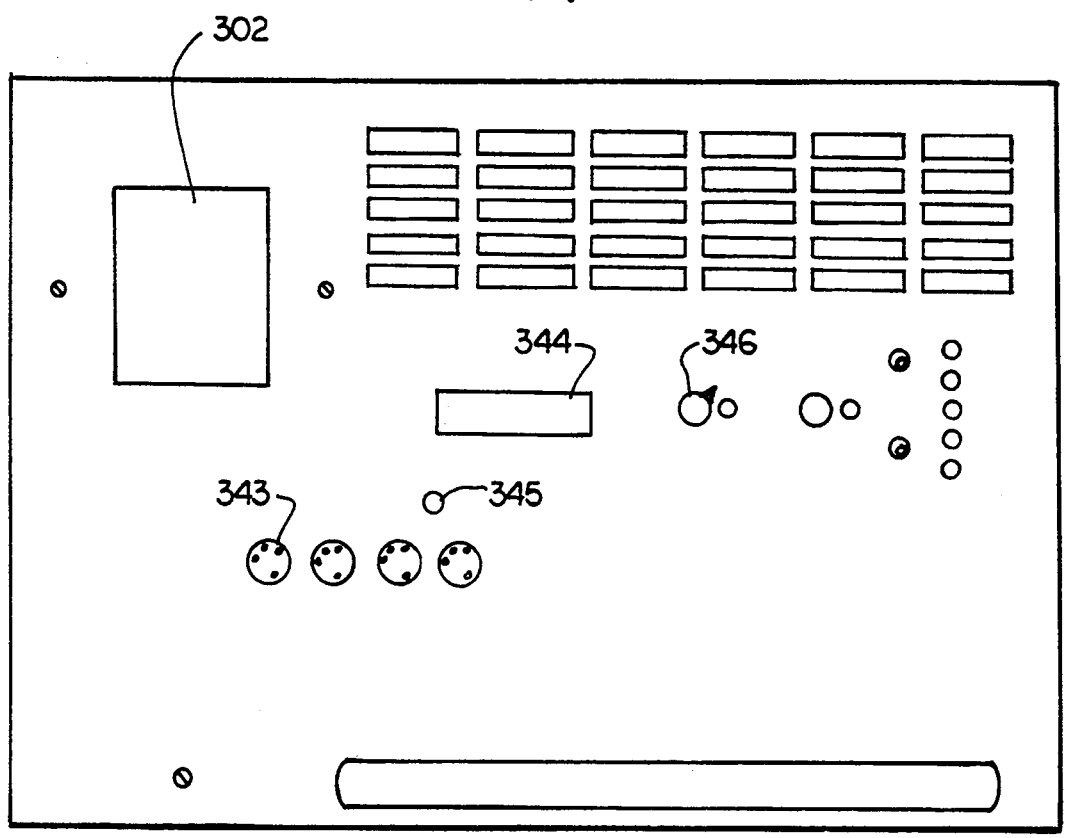
FIG. 8 is an elevation view of the front of the power supply for the embodiment of FIG. 1.

The power supply 30 may be seen generally in FIGS. 8 and electrically in FIGS. 2 and 3. The power supply includes components for monitoring and adjusting line voltage and providing desired lamp open circuit voltage, current limiting impedances an SCR assembly for lamp dimming, AC capacitors for power factor correction, a control board for logic and power control, and an interface board for data collection and user interfacing. Power supply 30 includes a connection 301 to an external AC power source. In the embodiment depicted, that is a 220 volt, 3-wire source. The power is supplied through a circuit breaker 302 to the control board 303. It is also applied to center of transformer 304.

The voltage is applied at 305 and 306 as can be seen in FIG. 3, on the board 303, to comparators 307 and 308. They also receive a sample voltage reference. The output of the comparators is used to set a flip flop 312 which in turn controls a relay driver 313. Relay 309 (FIG. 2) switches the line voltage from the 230 volt tap of transformer 304 to the 210 volt tap if the voltage sensed in comparators 307 and 308 suggest that the voltage is too high. Conversely, if the voltage is too low, it will retain the voltage at the 230 tap. A capacitor 310 is provided to reduce arcing of the relay and to provide a source of energy during commutation of the relay. Relay 309 can be conservatively sized, because of the capacitor 310. Although the foregoing example was described with respect to a 230 volt 3-wire supply, other similar arrangements can be used with other supplies.

The main contactor for the lamp 501 is driven by a contactor driver 318 which in turn is controlled by AND-gate 315. AND-gate 315 requires high inputs from delay 314, the power "on" switch 316 and interlock 317 to enable the contactor driver 318. Interlock 317 detects the presence of a protective pane in the light head, as will be discussed further. Thus, the pane must be in place and the power on and the line voltage set in order to operate the main contactor. The power "on" signal 316 may be derived from the memory set in the integrator discussed below. An additional delay 314 is interposed and feeds AND-gate 315 along with the power "on" switch 316 and the line from interlock sensor 317, also seen on FIG. 5. The contactor actuation allows power flow from the mains to the lamp.

The lamp 501 is typically a gaseous discharge lamps which starts with an extremely high voltage pulse, typically 10 kilovolts. After a current is struck, the lamp voltage drops to approximately 30 volts and then slowly increases to its nominal voltage. The voltage drop across the lamp 501 is sensed and applied to a summing differential amplifier 319, a comparator 320 and another summing differential amplifier 321. A reference voltage comparable to the operating voltage of the lamp 501 as warmed up is also applied to the comparator 320. The output of comparator 320 goes low when the lamp voltage reaches its operating voltage and is applied to the summing differential amplifier 319 so that when the lamp voltage is at its operating voltage, the lamp voltage and the sensed lamp current 322 are multiplied in multiplier 323. That product is applied to a further summing differential amplifier 324 along with the output of the comparator 320 and a signal 325 indicative of desired power level to operate the lamp 501 as recorded in the integrator discussed further with respect to FIG. 9. The stability of the closed loop feedback circuitry is maintained with compensation unit 326. This signal is applied to a gate driver 327 of the lamp SCR's 328. That is, the gate driver 327 controls the firing angle of the SCR's 328 in the forward and reverse directions to control the amount of power going to the lamp 501. The circuit works to keep the power supplied to the lamp constant at the set point, regardless of voltage changes.

The power monitoring to the lamp is achieved by obtaining the average and comparing it with a reference from an integrator to shift the phase of the firing angle of the silicon control rectifier. The reference is fed with a pulse width modulated signal. No direct electrical connection is needed because the signal is electrically isolated and sent through an optical coupling.

The power supply to the lamp includes a inductor L-1 which is parallel with the SCR to maintain the current to the lamp at at least 10% of maximum.

During the starting process, it is undesirable to operate the lamp in a constant power mode, since the demand for current would be beyond the limits of the lamp. To circumvent this situation, a constant offset is added to the lamp voltage to operate the lamp in a constant current mode. After the lamp voltage exceeds the warmup reference as noted by the comparator 320, the constant offset is removed and the lamp is allowed to operate in a constant power mode under the control of the summing differential amplifier 324 serving as an error amplifier.

The sample lamp voltage as applied to the summing differential amplifier 321 converts the voltage according to an inverse relationship to control a blower driver 329 to control the triac to the blowers 330 in the head as shown in FIG. 2. A motor speed control circuit suitable for use as the blower control is described in a copending application of Ira Pitel filed on even date herewith and entitled "Burst Voltage Motor Speed Control". The entire disclosure thereof is incorporated herein by reference. That circuitry has the power controlled by short bursts of an integral number of fundamental cycles "on" and a short number of cycles "off". The voltage burst is initiated at strategic points in the cycle to minimize the electrical and mechanical transient response. This minimizes power loss and abrupt torque changes. By providing the blower control as responsive to lamp voltage, it is also responsive to lamp temperature. Thus, controlling the blower speed with the lamp voltage allows the lamp to remain at higher temperatures during an idle state and to rapidly set maximum luminous intensity during normal full output state. That is, the lamp can have its power reduced between illumination cycles. However, the temperature will remain near its desired level because the fan speed will be reduced if the voltage drops, so that the temperature will not drop too far during off cycles.

The blower driver 329 is also controlled by the error amplifier 321 to operate the blower on high speed when the power "on" switch 316 is switched off. This permits rapid cooling of the lamp so that if lamp changing is the reason for turning off the power, it can be changed as quickly as possible. Also, if it is desired to restart the lamp, rapid cooling brings its temperature back down to the range in which it can be restarted.

Figure 5:
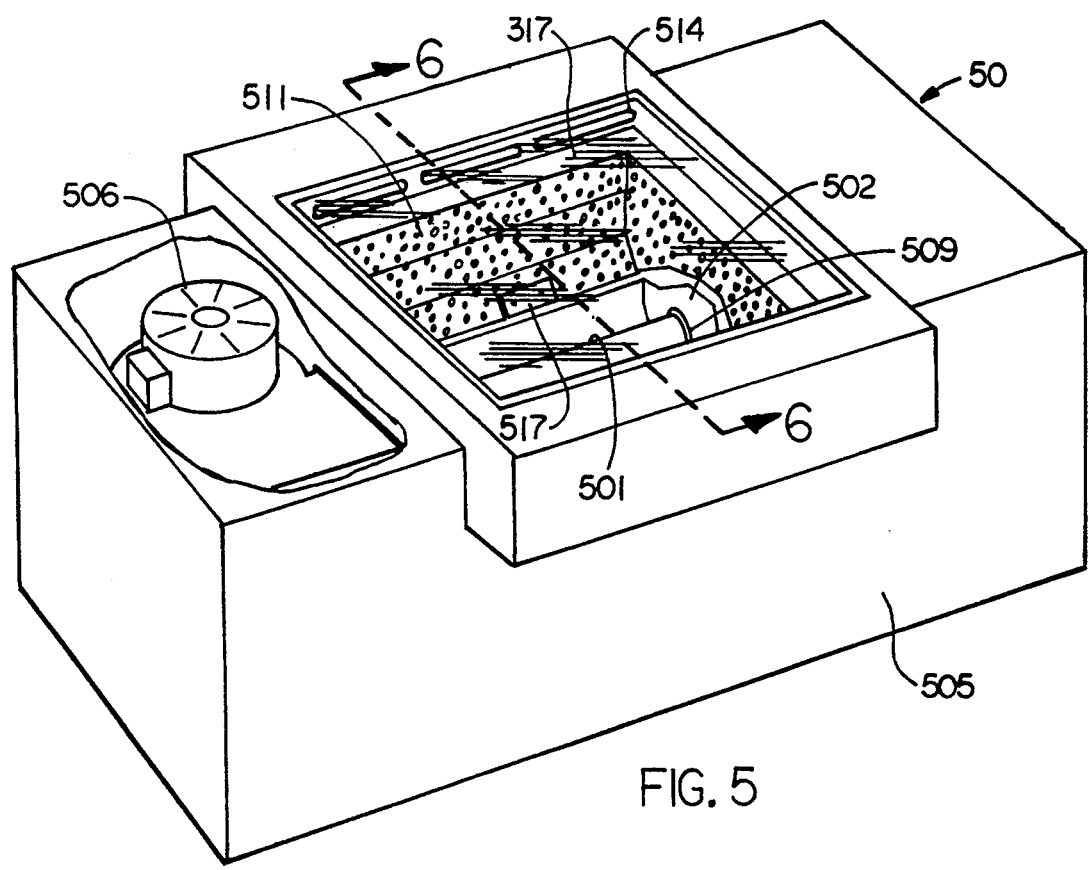
FIG. 5 is a perspective view of the housing for the light source as used in the embodiment of FIG. 1.
Figure 6:
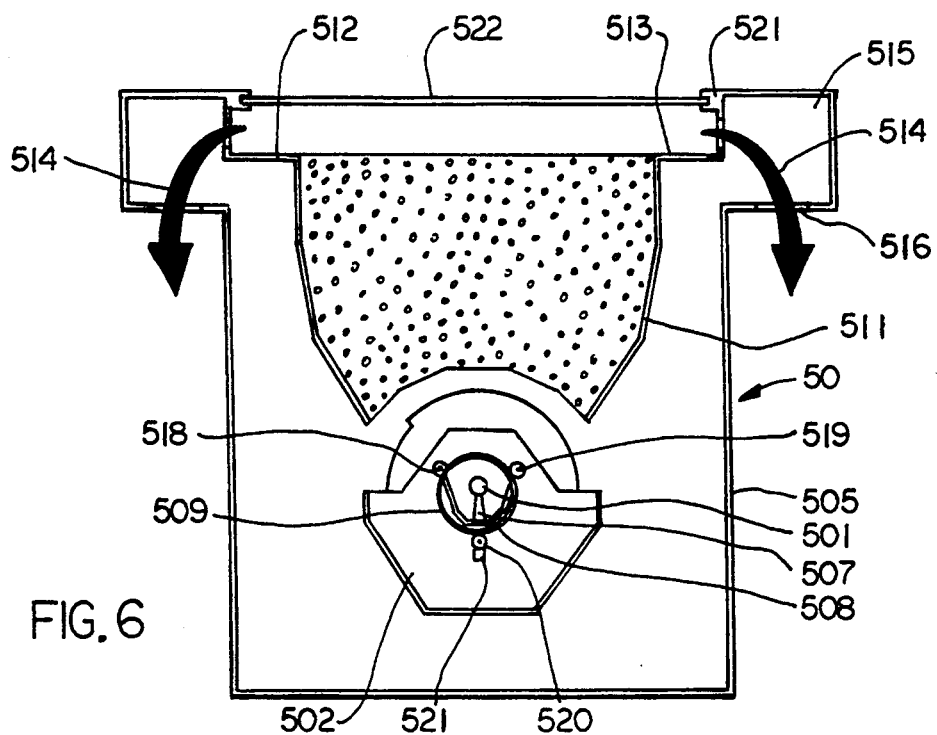
FIG. 6 is a sectional view of the housing of FIG. 5, taken along lines VI—VI.

The shutter 502 shown in FIGS. 5 and 6 in the light head 50 is driven by a motor 503 in response to signals from the control board 303. A shutter enable signal 331 is applied with the interlock signal 317 and the inverse of the warmup complete signal from comparator 320 in an AND-gate 330. That signal is applied to a delay 332 to permit time for the lamp power to increase to its operating level and for lamp operating temperature to increase to its desired level before opening the shutter. Upon expiration of that delay, that signal and the shutter sense signal 504 indicative of a closed shutter are applied to AND-gate 333 which sets a flip flop 334 applying to OR-gate 335. The output of OR-gate 335 is applied to AND-gate 336 which also receives the delay signal from delay 314 indicative that the tap change has been completed. The AND-gate output is applied to the shutter motor drive 337 to drive a triac 338 to drive the shutter motor 503. The motor will drive the shutter until a cam on the shutter senses the full open position and reverses shutter sense 504, which resets the flip flop 334 to stop the motor. It also resets flip flop 337. Upon receipt by the reset flip flop 337 of a set signal from AND-gate 338 of signals inverse to those applied to AND-gate 333, the motor is again driven to shut the shutter. The inverse signal from AND-gate 338 will be applied to flip flop 337 when a shutter close signal is applied to shutter line 331.

Upon extinguishing the power "on" signal 316, an inverse signal is applied to three minute timer 339 through NOT-gate 340. That signal is applied to AND-gate 341 along with the interlock sense 317. When both interlock and the inverse signal from the timer 339 are low, the output of AND-gate 341 is applied through data selector 342 to close the shutter. This prevents access to the lamp when interlock senses that the protective pane is out of place or while the power is on, or for three minutes thereafter, in order to prevent accidental touching of the extremely hot lamp or the energized electrodes.

FIGS. 2 and 8 also illustrate a very convenient feature of the invention—chainable control lines. The control unit, in large part the power supply of FIG. 8, controls various remote units such as the filter assembly 40 and the light head 50 and does so with cabling with is conveniently installed by a customer on his or her own premises. It has been found in the past that such cabling can be confusing to novices, and the present invention provides a fail-safe way to provide such cabling. First, as can be seen in FIG. 8, there are four physically identical but electrically different pin sockets 343. Identical pin sockets are provided on the remote units to be controlled and cabling is provided to extend between the pin sockets 343 and the remote sub-system unit to be controlled. Thus, any cable can be used to extend from the pin sockets 343 to the pin sockets on the remote unit. If, however, the remote unit is improperly selected, nothing undesirable will happen. The reason for this is that only one of the leads of each of the pin sockets 343 is provided with a connection to an associated signal or power source. A similar configuration is use in the subsystem unit. Thus, by making the connections in the main unit and subsystem units in the factory so that they agree with each other, but not with any other unit, a mistake in connecting pin sockets with the cables will not result in any electrical connection being made. The user will find his error by the non-functioning of the equipment and be able to readily reconnect the units as designed. Further, this principle may be generalized for remote unit connections as seen in FIG. 2. A plurality of connections are provided between the power supply and the filter unit and also the APC 1 board in the APC1 assembly. The APC 1 board is provided with dipswitches which can be selectively actuated to make a desired one of the leads active. Thus, the signal derived from the power supply by the APC1 assembly from this connection can be used to switch on or off the input power from a 120 volt source to a vacuum pump. That is, the control signals are used to actuate or not, as desired, the power to the vacuum pump.

Also can be seen in FIG. 8, the hours used on any particular lamp can be recorded in a readable fashion on a lamp power reader 344. The reading can be reset to zero with a reset button 345 when a lamp is changed so that an accurate reading of the age of the lamp in use can be determined. The lamp idle power (i.e. the power supplied to the lamp to keep it hot during non-use) can also be selected using a selector switch 346. The electronic circuitry of the control board can be used to reduce the duty cycle of the SCR's 328 from full power (i.e. 7500 watts) to lesser values in increments of 100 watts by selectively gating the SCR's to make them conductive for that portion of the sinusoidal power input cycle as needed to achieve the desired power to the lamp. The power monitoring circuitry as disclosed maintains the power supplied to the lamp at the desired value.

Filter Unit

Figure 4:
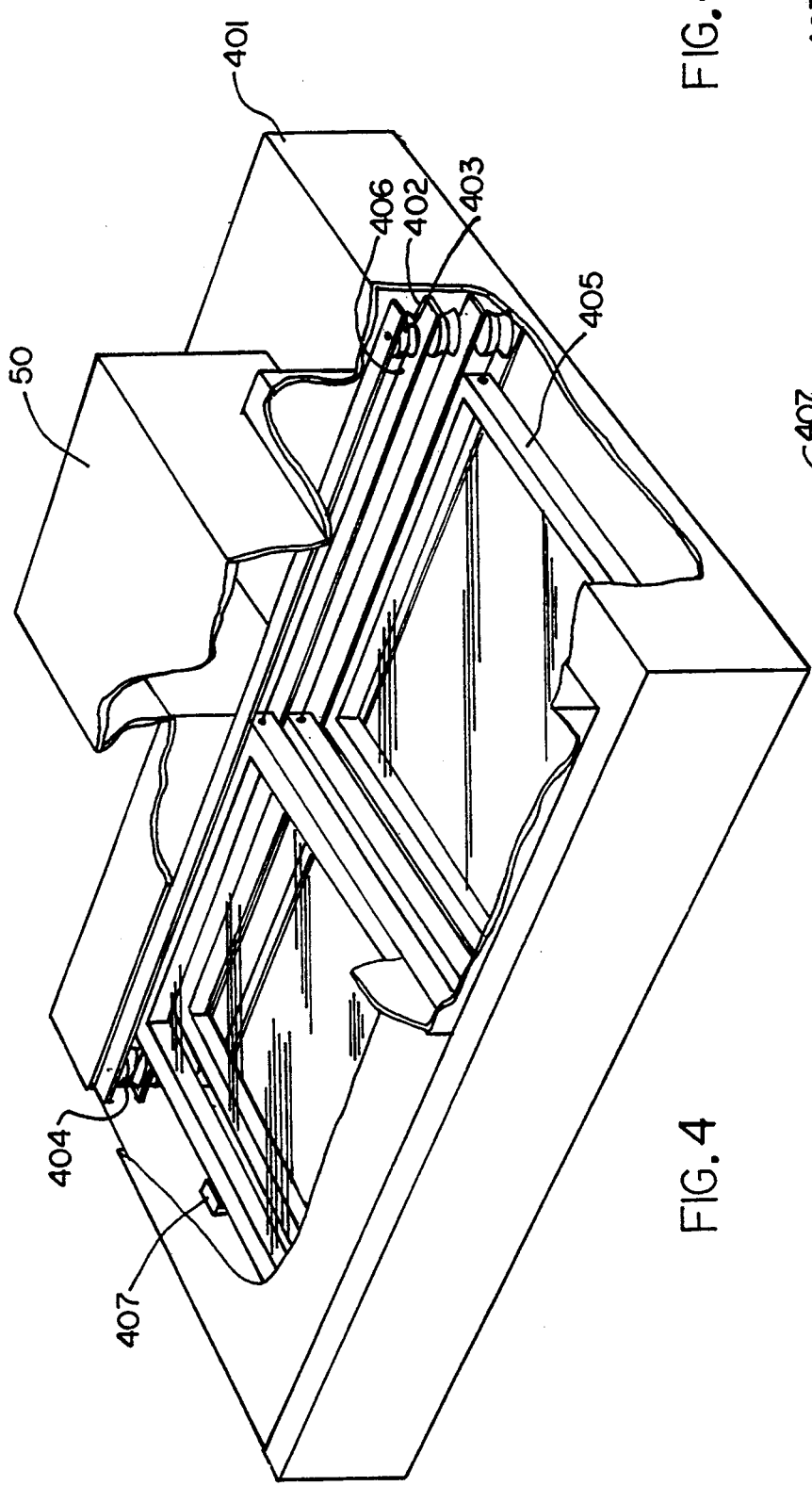
FIG. 4 is an enlarged perspective view of the filter unit of the embodiment of FIG. 1, partially broken away.

Referring now to FIG. 4, there is shown in a perspective view, partially broken away, the filter assembly including a housing 401. Housing 401 has a plurality of (at least three) pairs of opposed channels 402. The channels 402 on one side of the housing 401 are provided with a pair of pulleys 403 and 404, a movable frame 405 and a cable 406. The cable is preferably an aircraft cable such as is used to operate the control surfaces of aircraft, although any suitable cable could be substituted. Each frame 405 can removably support a filter 404. It does so by receiving an edge of the filter in an inwardly facing channel of the frame which also has a spring. The filter can be pressed against the spring and have its opposing edge inserted into an opposing channel so that the relaxation of the compression of this spring will lock the filter in place between the opposed channels of the frame 405. Each of the frames 405 can be independently positioned in alignment with the light head 50. Alternatively, multiples of them can be positioned simultaneously to achieve the filtering of the light emanating from head 50 as desired. The housing 401 is also provided with limit switches 407 at opposed ends of the housing, one for each end of the opposed pair of channels. Upon closing of the limit switch 407 by the positioning of its associated frame 405 thereagainst, the position of the frame can be sensed electrically.

Figure 4A:
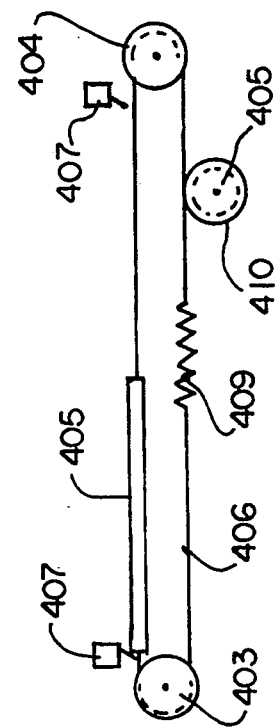
FIG. 4A is a schematic view of the filter positioning means of the filter unit of FIG. 4.

With reference to FIG. 4A, the operation of the positioning of the filters can be better seen. The cable 406 includes in its length a spring 409. Also, the cable 406 is wrapped once around a sheave driven by a motor 410. Thus, the energization of the motor in one direction will rotate the sheave and drive the cable 406, which in turn moves the frame 405. When the frame 405 reaches an extended position, to either side of the frame 405, the associated limit switch 409 is closed. The sensing of the closure of such switch stops the motor and holds the frame in position. When it is desired to move the frame the opposite direction, the motor is reversed and the frame moves until the other of the limit switches 407 for that frame senses the reaching of the frame at its most extended position.

The presence of spring 409 in the cable line limits the tension in the cable. Thus if a person's hand is in the way of the frame, the cable can slip around the rotating sheave 408 and not crush the hand. Similarly, if for some reason the motor becomes inoperative, the reduced tension in the cable permits the frame 405 to be moved by hand with the cable merely slipping around the motionless sheave.

Light Head

Figure 7:
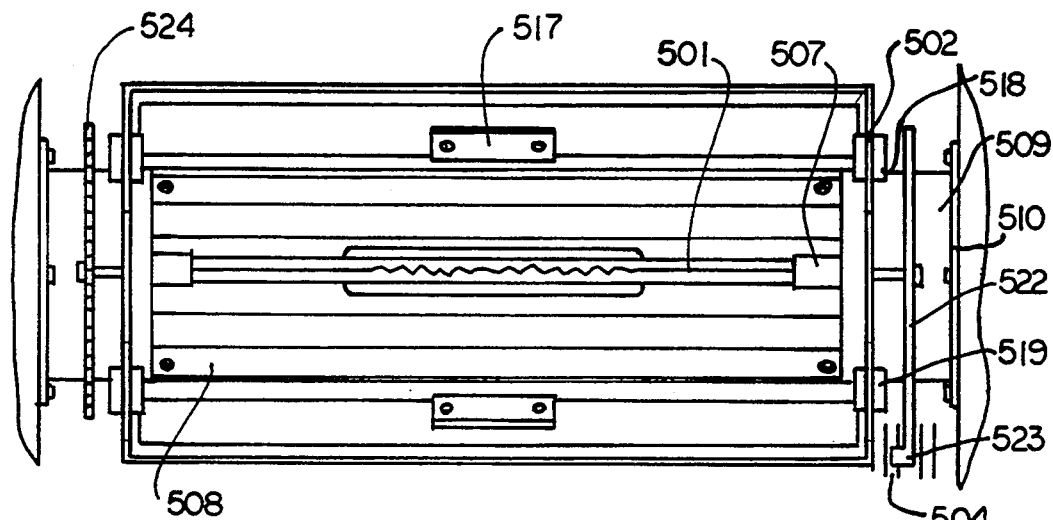
FIG. 7 is a view of the lamp and shutter assembly of the lamp housing of the embodiment of FIG. 1.

The light source for the apparatus 10 is included in the light head 50 as seen in FIGS. 5, 6 and 7. It includes a housing 505 having mounted on either end (only one is shown in FIG. 5), a cooling blower 330 mounted so that its discharge is somewhat at an angle to the axis of lamp 501. The lamp 501 is supported in a conventional lamp support 507 affixed to a reflector 508, all of which are affixed in turn to a bearing 509 having a passageway aligned with the length of the lamp 501. The bearing 509 is affixed to end wall 510 of the light chamber. The housing 505 has mounted in it a main reflector 511 of a dimpled specular material. The reflector is supported in opposite channels 512, 513 of the housing 505. The channels are provided with side openings 514, to chambers 515 which in turn have openings 516 through which hot air may escape. Thus, the air forced axially along the lamp 501 at an angle from the blower 330 swirls around the lamp 501 in a helical pattern to provide effective, uniform cooling and then passes outward into the interior of the main reflector 511, out through openings 514,516. It can also pass in the space between the housing 505 and the main reflector 511 to chamber 515 and out the opening 516.

The use of the helical or cyclonic air flow obtained by the use of the present invention reduces the power demands on the blower motors. Thus, instead of needing conventional 750 cfm motors, a 300 cfm rated motor suffices to adequately cool the lamp. Also, the helical airflow assures more even exposure, more uniform temperature over the lamp and, therefore, less preferential depositing of dopants. The end result is longer useful lamp life.

As noted above in the Power Supply discussion, the blower speed is desirably controlled to maintain the lamp temperature at a desired set point by correlating blower speed with the voltage across the lamp, which is indicative of lamp temperature.

Bearings 509 support the end faces of shutter 502 by outward engagement with roller bearings 518, 519,520. Roller bearings 520 (one in each end of the shutter) are supported in the shutter 502 by compression springs 521 while the other roller bearings are at fixed positions. The shutter thus is supported by the bearing 509, but has some free movement because of the spring 521. This movement is necessary to accommodate changes in dimensions caused by the extreme heat environment to which the components will be exposed.

The shutter relationship to the lamp can be seen better in FIG. 7 in which the bearing 509 is shown secured to an end wall 510 of the housing 505. The reflector 508 is shown secured to the bearing 509 and having the lamp support 507 supported thereon.

To one end of shutter 502 is affixed a cam ring 522 having a cam 523 as a portion thereof. The cam ring 522 has a shutter position switch 504 adjacent thereto supported in the housing so that, upon rotation of the shutter, the cam 523 can actuate the shutter position switch 504. The actuation of switch 504 sends the signal to the AND-gate 333 and flip-flop 334 referred to with respect to FIG. 3.

Affixed to the other end of the shutter 502 is a gear 524 about which a chain is applied to be driven by the shutter motor 503 actuated by triac 338 referred to with respect to FIG. 3, but not shown herein. The mechanical apparatus of FIG. 7 is thus controlled by the electronics of FIGS. 2 and 3.

The shutter 502 is made of a steel base with a black ceramic coating. The black ceramic coating is provided because of the extreme range of temperatures to which the shutter is exposed being in close proximity to the high temperature lamp. The black ceramic does not deteriorate at the range of temperatures and therefore maintains its light-absorbing power long after previously used materials would have deteriorated.

Blackened portions 517 of such ceramic coating are preferably affixed to the reflectors 511 and 508 proximate the mid-portion of the lamp 501 to attenuate the reflected light in that region since the mid-portion of the lamps tend to be hot spots. The absorption of light by the blackened portion 517 compensates for the hot spots.

Opposed channels 520 and 521 formed in the head across from one another selectively support pane 522, typically of a material which filters out dangerous UV-B rays. The pane 522 is secured in position by a leaf spring (not shown) in one of the channels, which urges the pane to stay in place until the spring is compressed for pane removal. The presence of the spring is sensed by a switch 317 which generates the interlock signal referred to in connection with the power supply discussion.

Integrator

Figure 9:
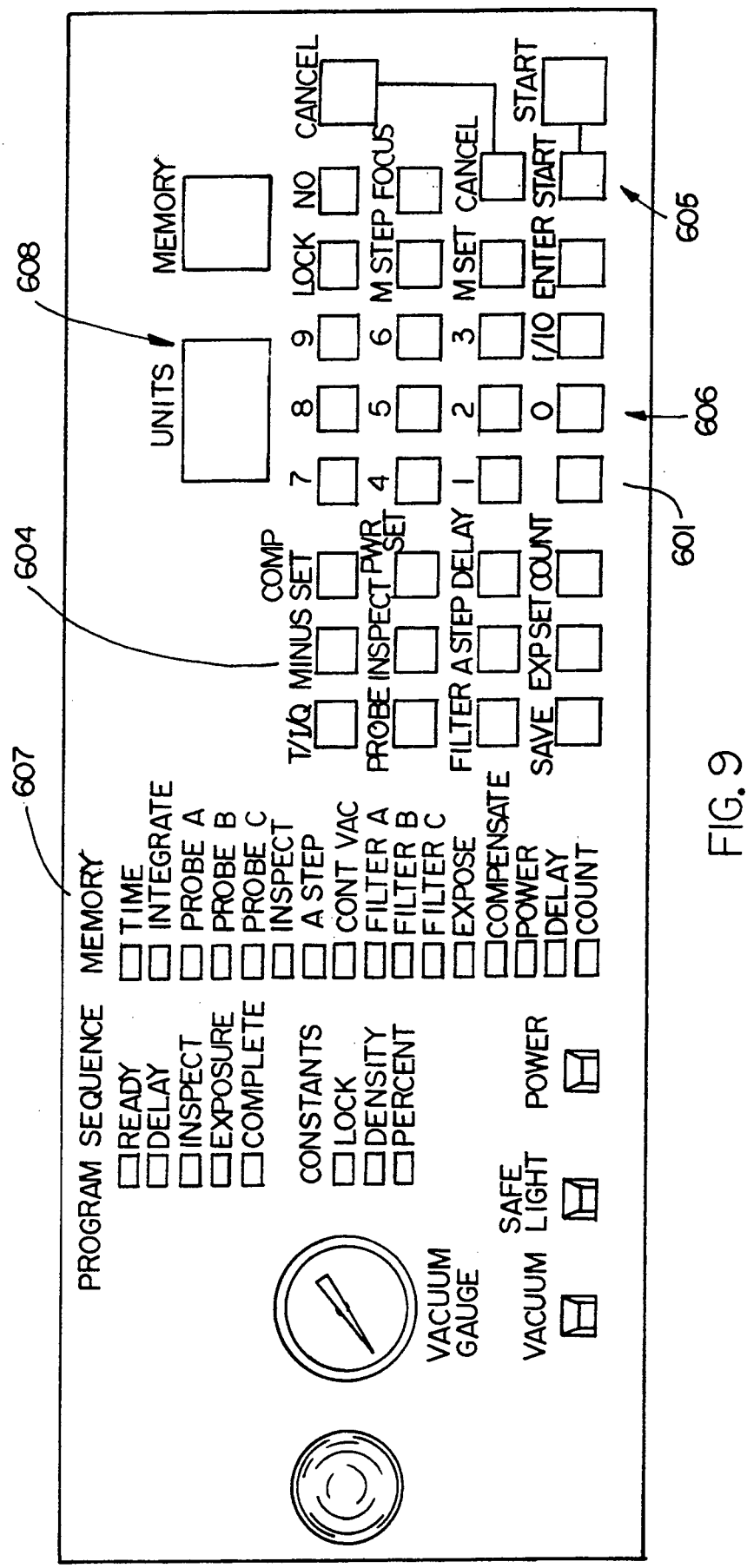
FIG. 9 is perspective view of the control panel for the embodiment of FIG. 1.

FIG. 9 shows the keyboard 601 of the integrator 60 of FIG. 1. The details of the integrator circuit and its programming will be dispensed with in the interest of clarity and brevity, particularly since those of ordinary skill in the art can readily come up with such details once the mode of operation as disclosed herein is made known to them. As can be seen in FIG. 2, the data entered on keyboard 601 is applied to a digital board 602 and from there to an analog board 603. One of the main features of the keyboard and digital board are the input and storage of programs for the sequencing of the operation of the entire apparatus.

The keyboard 601 includes a first group of function keys 604, a second group of function keys 605, a group of numeric keys 606, a plurality of signal lights 607, and readouts 608. The keys and lights can be used to program routines for operation of the apparatus and store them in memory and then, as desired, selectively operate the equipment according to a recorded memory sequence. Programming is initiated by pressing the key labelled "M-Set". Then a numeric program number from 1 to 99 is entered via the numeric keypad followed by the "Enter" key to store the program number which is displayed at the memory readout. This number can then be used to recall and act on information in the memory location entered.

The "Enter" button stores program information that has been selected in a program function via the numeric keypad.

Upon pressing the "Focus" button, the signal light labelled "Exposure" under the phrase "Program Sequence" will illuminate, the shutter will open and the exposure lamp will illuminate to the wattage previously selected on the PWR-SET mode. This function permits photocell (i.e. photocells 21, 22, and 23 of FIG. 1) calibration to a specific wattage. If no wattage is selected, the exposure lamp will automatically illuminate to 500 watts. To turn off the FOCUS mode, press CANCEL.

Upon selecting the function key "ESP-SET", the EXPOSE signal light on the memory signal light panel will flash. The operator is then able to select an exposure in units from 00.1 to 999. Thus, this gives the operator extended flexibility in selecting exposure time.

Upon pressing the PWR-SET function button, the signal light labelled "POWER" on the memory signal light panel will flash. The operator is then able to make a power selection by entering the desired wattage in kilowatts via the numeric keypad. After the desired wattage has been selected, the "ENTER" key is pressed to store this value. During program operation, the power selected in the power set mode is the data entered on the power set line 325 of FIG. 3.

By pressing the "DELAY" function button, the delay signal light on the memory signal light panel flashes and the operator is able to select a specific vacuum delay time from 00.1 to 999 seconds. The "INSPECT" button is used in conjunction with the delay mode. By pressing the "INSPECT" button, the inspect signal light on the memory signal light panel illuminates. This enables the operator to inspect the vacuum chamber evacuation before the exposure starts. To continue the exposure, the operator must press "START". If a problem is found with the vacuum chamber evacuation, "CANCEL" may be pressed and the program returns to the beginning of the exposure program and the vacuum pump is shut off.

The "CANCEL" button can be used to cancel exposure before it is complete. To reset the integrator after an exposure program is completed as well as to reset the COUNT mode and the FOCUS mode, when they are selected.

The "START" button is used to initiate exposure programs and to reset the integrator after the exposure program is completed.

By pressing the "1/10" button, the operator can select an exposure setting or delay time to tenths of units or seconds. That is, when "1/10" is depressed, a decimal point of a numeric value being changed moves one digit to the left.

Upon pressing the "COUNT" button, the operator can see the sum of completed exposures from all exposure programs. To retain the total memory after inquiry, press "ENTER". To reset the count to zero, press "CANCEL".

Pressing the "LOCK" function key illuminates the "LOCK" signal light on the constant signal light panel. This will disable the numeric keys as well as the filter key, the time/integrate/quartz key, the output key and the A-step key. These keys can be unlocked by pressing "LOCK" a second time.

By pressing the "M-STEP" key, the operator will be able to sequentially scroll through the program channels and program number will be displayed on the readout 608.

By pressing "A-STEP" once, the "AUTO" step function is activated, and the "A-STEP" signal light on the memory signal light panel will illuminate. This function allows the operator to make the integrator proceed to the next consecutive exposure program channel when it completes an exposure program that has a step function selected. By pressing the "A-STEP" button once more, the continuous vacuum function will be activated and the "CONT VAC" signal light on the memory signal light panel will also illuminate. This continuous vacuum function allows the operator to maintain a vacuum drawdown between auto step exposures. Thus, if desired, the same negative and light sensitive material could be used with two different filter settings or power exposures or whatever is required to expose the materials.

Pressing the "FILTER" function key selects a filter or combination of filters that can be stored in an exposure program. Upon execution of the exposure program, the appropriate filters will move into position before the exposure begins. By repeatedly pressing "FILTER", the operator can select the desired combination of filters. Assuming the filters are identified as filters A, B and C, logic pattern for filter selection is: A; B; C; AB; AC; BC; ABC. During the selection process, the appropriate signals lights for the selected filter will illuminate on the memory signal light panel.

Exposures may need to be changed due to variables in film speed, chemistry, number of overlays, or as an option by the user. These changes are known to the art as compensations, and the present invention permits compensation to be accomplished in percentages or log density. Upon selecting the "COMP-SET" function key, the "COMP" signal light on the memory signal light panel flashes and the readout reads .00. The "DENSITY" signal light also illuminates. By pressing the "%D" button, the signal light display will read 00. and the % signal light will illuminate. Note that the % and "DENSITY" signal lights are located on the constants signal light panel. A compensation value may be entered via the numeric keypad by entering the digits and then depressing "ENTER". When a compensation has been entered, the "COMP-LED" on the memory signal light panel will remain illuminated along with either the "%" or "DENSITY" signal light on the constants signal light panel. To clear a compensation value, select "COMP" and enter "0" as a value, then press "ENTER". While in the compensation mode, whether it be "%" or "DENSITY", depressing the "—" button switches the entered compensation value to a minus value.

Once the compensation mode has been selected, the % density mode of compensation can be selected by pressing the "%D" button. This converts the value shown in the readout from a % to a density. For example, if 0.4 is entered as a density and the "%D" button pressed, the value changes to 10%, with "10" showing in the readout display. Then, pressing "ENTER" adds the selected value to the exposure program. Thus, if a 10 second exposure is programmed and "START" is pressed, the count will begin at "11" so that the exposure is 10% greater than was originally programmed. While still in the compensation mode, if the "—" button has been pressed, the example exposure would have started at "9", 10% less than the selected exposure.

Upon initially powering up the apparatus, the "INTEGRATE" mode will be automatically selected as indicated by illumination of the "INTEGRATE" signal light on the memory signal light panel. The "INTEGRATE" function provides consistent exposures by compensating for power fluctuations as well as lamp deterioration. It does so by evaluating the light as actually received on the vacuum frame 20, particularly as measured by photocells 21,22,23 and identified in the keyboard as probes A, B, and C. The "INTEGRATE" mode of operation allows the operator to select light units of up to 999 units, by tenths of a unit if necessary.

The invention permits the integration mode to be selected for each exposure. Thus, by pressing the "T/I/Q" button once, the quartz mode will be selected and both the "TIME" and "INTEGRATE" signal lights on the memory signal light panel will be illuminated. The quartz function is designed to be used in conjunction with a quartz halogen light source. In the quartz mode, the electronics continuously samples the voltage to the lamp and integrates it and selects the exposure to terminate when a desired integrated value is reached. If the voltage is low, the length of the exposure will be extended to compensate for the relative dimness of the lamp. The inverse is true if the voltage is high.

By pressing "T/I/Q" button once more, the TIME mode will be selected and the "TIME" signal light on the memory signal light panel will be illuminated. In the "TIME" function, the operator selects exposure times in seconds from a tenth of a second up to 999 seconds. In the "INTEGRATE" mode, the exposure is calibrated using the light impacting on one of the probes. The "PROBE" button allows the operator to select which of the three probes is to be used as the reference to be integrated. Upon initial power-up, the integrator automatically selects "Probe A" and the probe A signal light on the memory signal light panel is illuminated. By pressing the "PROBE" button once, "Probe B" is selected and its signal light is illuminated. A third pressing results in the selection of "Probe C" and illuminating of its associated signal light.

The "SAVE" button actuates a function to save all specific information that has been selected for the exposure program. When building an exposure program, "SAVE" must be pressed before leaving the program channel or the information entered will be lost.

When the "DIM" button is pressed, all of the signal lights on the integrator extinguish; pressing that button again reilluminates all signal lights appropriate for the stage of operation. This provides reduced illumination for particularly sensitive materials. The control panel is also provided with a vacuum regulator to control the level of vacuum in the exposure chamber and a vacuum gauge to measure the same. A vacuum switch is provided to provide for manual operation. Also provided is a safe light switch which can be used to switch on and off a safe light as desired.

The "POWER" switch on the keyboard is used to operate the control circuit, generating the power set signal 316 and discussed with respect to FIG. 3.

Those of ordinary skill in the art will be able to use the foregoing discussion of the functioning desired for the keyboard operation of the programmable features to devise suitable specific circuits using widely commercially available circuit components to carry out these functions.

Actuation of a particular program is accomplished by pressing the "M-SET" key and a corresponding numeric value corresponding to the program number desired to be operated, followed by the "ENTER" key and the "START" key.

During the programming of the data in a memory location, the signal light associated with the function being programmed flashes on and off to provide a prompt to the programmer of what value is being set at a particular time. Similarly, during program actuation, the program sequence lights illuminate (unless the DIM mode is selected), corresponding to the portion of the program operating at the time.

The present invention has been found to improve the productivity of workers making exposures of negatives by 50–100%, due to the flexibility of capabilities built into the unit, and its easy programmability and rapid adjustment from one set of operating conditions to another.

Three levels of protection from line voltage fluctuation are provided in this system: line voltage tap select; integration of the light according to the desired mode; and use of the actual power to the lamp being used to modulate the power supply to the lamp. This redundant level of protection provides maximum control over the actual exposure made. The selectability of powers output from the light permits a wide range of emulsions of light sensitive material to be used. These advantages provide accurate control and optimum productivity to provide those of ordinary skill in the art with a unique tool.

Various modifications to the foregoing will occur to those of ordinary skill in the art, which modifications are deemed to be within the scope of the invention as enumerated in the claims.

What is claimed is:

1. An exposure system for light sensitive materials comprising
   a vacuum frame to hold the light sensitive materials
   a light source to provide light to expose said light sensitive materials
   a filter housing interposed between said light source and said vacuum frame, said filter housing having at least three filters selectively positionable between said light source and light sensitive materials in said vacuum frame,
   including means to position said filters between said light and said vacuum frame singularly or in multiples and having opposed channels facing one another across an open area and wherein said positioning means for each filter includes a frame for said filter having opposed sides and mounted for reciprocation in opposed channels of said housing and a cable connected to either side of said frame and passing through said housing to be driven to position said frame.

2. An exposure system as claimed in claim 1 wherein said positioning means for each filter includes a motor driving a sheave around which the cable for the filter is trained to drive said frame and its filter into or out of position by actuation of said motor.

3. An exposure system as claimed in claim 1 wherein said housing has limit switches actuable by the positioning of the filter either in or out of position to stop the actuation of said motor.

4. An exposure system as claimed in claim 2 wherein said cable and sheave are selected of materials and configured so that said cable can slip around said sheave to prevent injury to things in the way of a driven filter or to permit the movement of said filter by hand without actuation of said motor.

5. An exposure system as claimed in claim 4 further comprising a spring in said cable.

6. An exposure system as claimed in claim 2 further comprising a memory unit to recall a particular arrangement of filter positions and a program actuation means to actuate said positioning means to position said filters in accordance with a recalled arrangement.

7. An exposure system for light sensitive materials comprising
   a vacuum frame to hold the light sensitive materials,
   a light source to provide light to expose said light sensitive materials, and
   a filter housing interposed between said light source and said vacuum frame, said filter housing having at least three filters selectively positionable between said light source and light sensitive materials in said vacuum frame,
   including means to position said filters between said light and said vacuum frame singularly or in multiples and
   opposed channels facing one another across an open area wherein said positioning means for each filter includes a frame for said filter having opposed sides and mounted for reciprocation in said opposed channels of said housing and a cable connected to either side of said frame and passing through said housing to be driven to position said frame and a motor driving a sheave around which the cable is trained to drive said frame and its filter into or out of position by actuation of said motor, said cable and sheave being selected of materials and configured so that said cable can slip around said sheave to prevent injury to things in the way of a driven filter or to permit the movement of said filter by hand without actuation of said motor and including a spring in said cable to limit the tension on the cable, and limit switches on said housing actuable by the positioning of the filter either in or out of position to stop the actuation of said motor, and further comprising a memory unit to recall a particular arrangement of filter positions and a program actuation means to actuate said motor to position said filters in accordance with a recalled arrangement.

8. An exposure system for light sensitive materials comprising
   a vacuum frame to hold the light sensitive materials
   a light source to provide light to expose said light sensitive materials
   a filter housing interposed between said light source and said vacuum frame, said filter housing
   having at least three filters selectively positionable between said light source and light sensitive materials in said vacuum frame,
   including means to position said filters between said light and said vacuum frame singularly or in multiples including a plurality of selectively positionable frames, at least one of said filters being removably mountable in at least one of said frames.

9. An exposure system for light sensitive materials comprising an electrically powered high temperature light source having two ends and a mid-portion, a housing supporting said electrically powered light source and having air exhaust openings proximate said mid-portion of said light source, a support for the light sensitive materials, a shutter supported in said housing to selectively expose light sensitive materials on said support to light from said high temperature light source and a blower arranged with respect to said light source in said housing to blow cooling air towards said ends of said electrically powered light source at an acute angle to the light source length, to form a helical airflow around said light source and out said air exhaust openings.

10. An exposure system for light sensitive materials comprising a high temperature light source, a power supply electrically connected to said light source through a switch, a shutter for said light source, a control means to control said light source and said shutter, said control means including a timer and being responsive to said switch to hold said shutter closed for a period of time after said switch is opened long enough to permit cooling of said light source and to open said shutter after expiration of the period.

11. An exposure system for light sensitive materials as claimed in claim 10 further comprising a housing for said light source and said shutter, said housing having an open face through which light from said light source passes when said shutter is open and a removable pane covering said open face with an indicator to indicate the presence of said pane covering said open face, wherein said control means includes means responsive to said indicator and said switch to close said shutter when said indicator senses removal of said pane while power is being supplied to said light source to prevent access to said light source while power is being supplied to said light source.

12. An exposure system for light sensitive materials as claimed in claim 10 further comprising a blower to cool said light source and controlled by said control means, wherein said control means actuates said blower during the period after said switch is opened to hasten the cooling of said light source.

13. An exposure system as claimed in claim 12 wherein said control means is capable of controlling the rate of flow of air through said blower within a range and maintains the rate at a high level of the range during the period.

14. An exposure system as claimed in claim 10 wherein said light source is a high temperature, electrically powered light source having a length, two ends and a mid-portion, and wherein said system further comprises a housing supporting said electrically powered light source and having air exhaust openings proximate said mid-portion of said light source, and a blower arranged with respect to said light source in said housing to blow cooling air towards said ends of said electrically powered light source at an acute angle to the light source length, to form a helical airflow around said light source and out said air exhaust openings.

15. An exposure light for light sensitive materials, particularly for materials requiring a particular spectral distribution of incident light, comprising
 an electrically powered light source,
 an electrical energy supply to said light source,
 a voltage drop sampling means across said light source,
 a blower arranged with respect to said light source to blow cooling air towards said light source, and
 a speed control device for said blower to control the speed of said blower in response to sampled voltages to maintain the temperature of said light source at a desired level wherein said electrically powered light source has a length and two ends and said blower provides air at said ends of said electrically powered light source at an acute angle to the light source length, to form a helical airflow around said light source.

16. An exposure light for light sensitive materials as claimed in claim 15 wherein said light source has a mid-portion and is supported in a housing with air exhaust openings in said housing proximate the mid-portion of said light source.

17. An exposure light for light sensitive materials comprising an electrically powered light source having a length, two ends and a mid-portion, a housing supporting said electrically powered light source and having air exhaust openings proximate said mid-portion of said light source, and a blower arranged with respect to said light source in said housing to blow cooling air towards said ends of said electrically powered light source at an acute angle to the light source length, to form a helical airflow around said light source and out said air exhaust openings.

18. An exposure light for light sensitive materials as claimed in claim 17 wherein said light source has portions which are more luminous than others, forming hot spots, and said housing includes a reflector adjacent one side of said light source with darkened portions adjacent said more luminous portions.

19. An exposure light for light sensitive materials as claimed in claim 18 wherein said darkened portions are black ceramic.

20. An exposure light for light sensitive materials as claimed in claim 18 wherein said more luminous portions are near said mid portion.

21. An exposure light for light sensitive materials as claimed in claim 18 wherein said housing has an open face and a rotary shutter positioned and arranged to be selectively rotated around said light source and said rotary shutter is provided with axial openings through which said cooling air may flow.

22. A control device for an exposure system for light sensitive materials comprising an electronic memory storage means and means responsive to signals stored in said electronic memory storage means to control variables, a keyboard coupled to said memory storage means to transmit variables to be stored and including function keys to select the variable to be assigned a value and numeric keys to assign a numeric value to a selected numeric variable, a plurality of signal lights connected to said memory storage means and arranged and connected to said memory storage means to display during data input to said memory storage means which variable is next to be assigned a value or selected, such that a user keying in data for storage can easily tell for which variable said keyboard is active to assign a selection or a numeric value.

23. A control device for an exposure system for light sensitive materials as claimed in claim 22 wherein one of said signal lights flashes on and off when data is to be entered for the variable labeled for that signal light.

24. A control device for an exposure system for light sensitive materials as claimed in claim 22 wherein said electronic memory storage means has capacity for 99 combinations of variables.

25. A control device for an exposure system for light sensitive materials as claimed in claim 22 wherein said electronic memory storage means has capacity for a plurality of combinations of variables, one of which is the power to a light source, in increments of 100 watts.

26. A control device for an exposure system for light sensitive materials as claimed in claim 22 wherein said electronic memory storage means has capacity for storage of a desired power to a light source, in increments of 100 watts.

27. A control device for an exposure system for light sensitive materials as claimed in claim 22 further comprising a switch to turn said signal lights on or off without disturbing the values stored in said memory storage.

28. An exposure system for light sensitive materials, particularly for materials requiring a particular spectral distribution of incident light, comprising an electrical light source having an operating temperature of at least 900 degrees celsius, two ends and a mid-portion, a control unit to control operating parameters of a plurality of subsystem units of the exposure system such as exposure level, chainable control lines from said control unit to the subsystem units including a plurality of physically equivalent, but electrically unique pin socket outputs each having a plurality of electrical leads on said control unit, physically equivalent, but electrically unique pin sockets each having a plurality of electrical leads on the subsystem units, and a plurality of cables having physically and electrically identical terminations such that any of said cables may be used to connect a pin socket of said control unit to a pin socket of a subsystem unit, said control unit including an electronic memory storage means and means responsive to signals stored in said electronic memory storage means to control said subsystem units, a keyboard input to said memory storage means of variables to be stored and including function keys to select the variable to be assigned a value and numeric keys to assign a numeric value to a selected numeric variable, a power supply to said light source, said power supply having the capacity to supply several kilowatts of electrical power to said light source and having the capacity to supply reduced power to said light source, reduced by increments of about one hundred watts and having a power consumption monitor to continuously monitor the power consumed in said light source and to modify the power supplied to said light source to compensate for any fluctuations in power consumption by said light source to maintain the power consumption at a constant level and being connected to said light source through a switch, a voltage drop sampling means across said electrical light source, a housing supporting said electrically powered light source and having air exhaust openings proximate said mid-portion of said light source and having an open face through which light from said light source passes when said shutter is open and a removable pane covering said open face with an indicator to indicate the presence of said pane covering said open face, a metal shutter in said housing having a black ceramic surface adjacent the light source to selectively expose light sensitive materials to light from said high temperature light source, a blower arranged with respect to said light source in said housing to blow cooling air towards said ends of said electrically powered light source at an acute angle to the light source length, to form a helical airflow around said light source and out said air exhaust openings, a speed control for said blower to control the speed of said blower in response to sampled voltages to maintain the voltage and therefore the temperature of said light source at a desired level, said control means being adapted to control said light source and said shutter and including a timer and being responsive to said switch to hold said shutter closed for a period of time after said switch is opened long enough to permit cooling of said light source and to open said shutter after expiration of the period and wherein said control means actuates said blower during the period after said switch is opened to hasten the cooling of said light source and including means responsive to said indicator and said switch to close said shutter when said indicator senses removal of said pane while power is being supplied to said light source to prevent access to said light source while power is being supplied to said light source.

29. A method of controlling the spectral output of a high temperature electrically powered light source having two ends and a mid-portion for an exposure system comprising supporting the electrically powered light source in a housing having air exhaust openings proximate the mid-portion of the light source, supplying electrical energy to the light source, sampling the voltage drop across the light source, blowing air towards the ends of the electrically powered light source at an acute angle to the light source length, to form a helical airflow around the light source and out the air exhaust openings, and controlling the rate of air blowing towards the light source in response to sampled voltages to maintain the voltage and therefore the temperature and spectral output of the light source at a desired level.

30. A method of exposing light sensitive materials comprising holding the light sensitive materials in a vacuum frame, exposing the light sensitive materials to a light source through a filter housing between the light source and the vacuum frame, and selectively positioning one or more of at least three filters in the housing between the light source and light sensitive materials in the vacuum frame by inserting a filter in a frame in opposed channels of the housing and actuating a cable connected to either side of the frame and passing through the housing to position the frame and its inserted filter.

31. A method as claimed in claim 30 wherein said positioning step includes energizing a motor driving a sheave around which the cable for the filter is trained to drive the frame and its filter into or out of position.

32. A method as claimed in claim 31 wherein the positioning step includes closing limit switches actuable by the positioning of the filter frame either in or out of position to stop the energization of the motor.

33. A method as claimed in claim 30 wherein said positioning step comprises slipping the cable around the sheave to move the filter by hand.

34. A method as claimed in claim 32 wherein there are a plurality of filters and said positioning step further comprises recalling a particular arrangement of filter positions stored in a memory unit and energizing the motor to position the filters in accordance with a recalled arrangement.

35. A method of cooling an electrically powered high temperature light source having two ends and a mid-portion for an exposure system for light sensitive materials, supporting the electrically powered light source in a housing having air exhaust openings proximate the mid-portion of the light source, and blowing air towards the ends of the electrically powered light source at an acute angle to the light source length, to form a helical airflow around the light source and out the air exhaust openings.

36. A method as claimed in claim 35 wherein the housing has a rotary shutter rotatable around the light source further comprising blowing the cooling air through axial openings in the rotary shutter.

37. A method of preventing an injury that would result from touching very hot light sources in an exposure system for light sensitive materials comprising providing a high temperature light source, a power supply electrically connected to the light source through a switch, a shutter for the light source, and holding the shutter closed for a period of time after the switch is opened long enough to permit cooling of the light source and opening the shutter after expiration of the period.

38. A method as claimed in claim 37 wherein the light source and shutter are housed in a housing, the housing having an open face through which light from the light source passes when the shutter is open, a removable pane covers the open face, and an indicator indicates the presence of the pane covering the open face, further comprising holding the shutter closed when the indicator senses removal of the pane while power is being supplied to the light source to prevent access to the light source while power is being supplied to the light source and thereby also prevent an injury that would result from touching energized electrical connections.

39. A method as claimed in claim 37 further comprising blowing cooling air towards the light source during the period after the switch is opened to hasten the cooling of the light source.

40. A method of controlling an exposure system for light sensitive materials comprising the steps of a) providing i) an electronic memory and means responsive to signals stored in the electronic memory to control variables, ii) a keyboard input to the electronic memory of variables to be stored and including function keys to select the variable to be assigned a value and numeric keys to assign a numeric value to a selected numeric variable, and iii) a plurality of signal lights connected to the electronic memory and arranged to display during data input to the electronic memory which variable is next to be assigned a value or selected, b) recording in the electronic memory values for a plurality of the variables by pressing function keys corresponding to a function to be remembered as prompted by the signal light corresponding to the function and pressing a numeric key corresponding to a value to be assigned to a function, and c) actuating the exposure system so that the functions and values recorded in the electronic memory are used to control the corresponding functioning portion of the exposure system.

41. A method as claimed in claim 40 wherein said step (b) comprising pressing keys to record 99 combinations of variables.

42. A method as claimed in claim 40 wherein said step (b) comprising pressing keys to store a plurality of combinations of variables, one of which is the power to a light source, in increments of 100 watts.

* * * * *